United States Patent
Taniyama et al.

[11] Patent Number: 5,701,221
[45] Date of Patent: Dec. 23, 1997

[54] MAGNETORESISTIVE THIN-FILM MAGNETIC HEAD AND METHOD OF FABRICATION THEREOF

[75] Inventors: Akira Taniyama, Odawara; Makoto Morijiri, Kanagawa-ken; Haruko Tanaka; Isamu Yuito, both of Odawara; Eiji Ashida, Hitachiota; Hiroaki Koyanagi, Hadano; Hideo Tanabe, Chigasaki; Tetsuo Kobayashi, Kanagawa-ken, all of Japan

[73] Assignee: Hitachi, Ltd., Tokyo, Japan

[21] Appl. No.: 416,653

[22] Filed: Apr. 5, 1995

[30] Foreign Application Priority Data

| | | | |
|---|---|---|---|
| Apr. 6, 1994 | [JP] | Japan | 6-068782 |
| Apr. 18, 1994 | [JP] | Japan | 6-078755 |
| Apr. 26, 1994 | [JP] | Japan | 6-088692 |

[51] Int. Cl.$^6$ .......................................... G11B 5/39
[52] U.S. Cl. .................................................. 360/113
[58] Field of Search ............................ 360/113, 126; 324/252; 338/32 R

[56] References Cited

U.S. PATENT DOCUMENTS

| | | | |
|---|---|---|---|
| 5,079,663 | 1/1992 | Ju et al. | 360/113 |
| 5,402,292 | 3/1995 | Komoda et al. | 360/113 |
| 5,436,777 | 7/1995 | Soeya et al. | 360/113 |
| 5,485,334 | 1/1996 | Nix et al. | 360/113 |

FOREIGN PATENT DOCUMENTS

| | | |
|---|---|---|
| 59-60726 | 4/1984 | Japan . |
| 59-104721 | 6/1984 | Japan . |
| 61-54012 | 3/1986 | Japan . |
| 3-125311 | 5/1991 | Japan . |
| 4-123307 | 4/1992 | Japan . |
| 4-182912 | 6/1992 | Japan . |
| 5-54336 | 3/1993 | Japan . |

Primary Examiner—Stuart S. Levy
Assistant Examiner—William R. Korzuch
Attorney, Agent, or Firm—Fay, Sharpe, Beall, Fagan, Minnich & McKee

[57] ABSTRACT

A magnetic domain controlling film for controlling the magnetic domain of a magnetoresistive film is formed by a patterning technique on a lower insulating film formed on a lower shield film. The magnetoresistive film is formed on the magnetic domain controlling film for converting a magnetic signal from a magnetic recording medium into an electrical signal using the magnetoresistive effect. A resist pattern is formed by the lift-off method on the magnetoresistive film in such a fashion as to leave a region of the magnetoresistive film corresponding to the tracks of the magnetic recording medium. A magnetoresistive element is formed by ion milling leaving only the portion of the magnetoresistive film corresponding to the tracks. An insulating layer is formed on the resist pattern, on the upper surface region of the lower insulating film other than the portion thereof right under the magnetic domain controlling film reduced in thickness by ion milling, and on the upper surface region of the magnetic domain controlling film other than the portion thereof right under the magnetoresistive film. An electrode film is formed on the insulating layer, after which the resist pattern is removed. The insulating layer is contiguously deposited on the upper surface region formed in a thin layer of the lower insulating film and on a part of the upper surface region formed in a thin layer of the magnetic domain controlling film.

6 Claims, 22 Drawing Sheets

MAGNETORESISTIVE THIN-FILM MAGNETIC HEAD AND METHOD OF FABRICATION THEREOF

BACKGROUND OF THE INVENTION

The present invention relates to a magnetic head used for magnetic recording apparatuses such as magnetic disc apparatuses, more particular to a read-only magnetoresistive thin-film magnetic head for detecting signals recorded in a magnetic recording medium using the magnetoresistive effect unique to a ferromagnetic material, and to a method for fabrication thereof.

A magnetoresistive thin-film magnetic head comprises an upper shield film and a lower shield film formed on a substrate, a magnetoresistive film, a biasing film for applying a biasing magnetic field to the magnetoresistive film, a pair of opposed electrodes electrically connected to a magnetoresistive element, an upper gap film (upper insulating film) formed between the magnetoresistive element and the upper shield film, a lower gap film (lower insulating film) formed between the magnetoresistive element and the lower shield film, and a noise suppression film (magnetic domain controlling film) for controlling the magnetic domain of the magnetoresistive element.

An example of the prior art relating to the present invention is disclosed in JP-A-3-125311 (reference (1)). The invention disclosed in reference (1) is concerned with a technique for fabricating a magnetoresistive thin-film magnetic head using what is called the lift-off method. More specifically, a magnetoresistive element is formed by ion milling with a resist pattern as a mask according to the lift-off method, after which a hard magnetic film and an electrode are formed, followed by separating the resist pattern by the lift-off method.

The invention disclosed in the above-mentioned patent publication is intended to improve the electrical insulation between the lower shield film and the electrode by forming an insulating film before forming the hard magnetic film (noise suppression film). The lower shield film, though not described in the drawings attached to reference (1), is required for reducing the effect of the signals from adjacent tracks at the time of reading signal from the magnetic recording medium by a magnetoresistive thin-film magnetic head. The lower shield film is an electrical conductive film.

The electrode for conducting the current to the magnetoresistive element (MR sensor) is required to be formed into a shape that can secure a predetermined electrical resistance. For this purpose, a part of the electrode is formed in a region other than the hard magnetic film or the magnetoresistive element (MR sensor). An insulating film (lower gap film) is formed between the magnetoresistive element (MR sensor) and the lower shield in order to prevent leakage to the lower shield film of the current supplied to the magnetoresistive element (MR sensor). In similar fashion, another insulating film (upper gap film) is formed between the electrode and the lower shield in order to prevent the leakage from the electrode to the lower shield film. In reference (1), an electrode film is continuously formed after forming a hard magnetic film (noise suppression film).

In a magnetoresistive thin-film magnetic head, electrical insulation is required between a magnetoresistive film, an electrode film and an upper shield film and also between a magnetoresistive film, an electrode film and a lower shield film where the current for detecting magnetic signals flows. A sufficient voltage resistance, i.e., a sufficient dielectric strength between the upper and lower shield films therefore is indispensable for improving the head life and the output of the detection signal.

JP-A-5-54336 (reference (2)) discloses a magnetoresistive thin-film magnetic head comprising an insulating film (gap film) between upper and lower shield films. In spite of this, the same disclosure includes no reference to securing the dielectric strength.

JP-A-59-104721 (reference (3)), JP-A-59-60726 (reference (4)) and JP-A-61-54012 (reference (5)) disclose a structure comprising an insulating layer formed between an upper shield film and an electrode film to improve the dielectric strength between the upper shield film and the electrode film.

JP-A-4-123307 (reference (6)) discloses a technique intended to prevent the short-circuiting between the upper and lower shield films which otherwise might occur as a result of a reduced thickness of the insulating layer at a misalignment of a connector between a magnetoresistive element and an electrode or the portion of the electrode riding over the magnetoresistive element at the time of depositing an insulating layer. For this purpose, the thickness of the insulating layer at the portions other than the track is increased as compared with that of the insulating layer at the track. Specifically, after the magnetoresistive element on the insulating layer is patterned, another insulating layer is deposited before deposition of an electrode, after which an electrode is deposited thereby to eliminate the electrode misalignment.

JP-A-4-182912 (reference (7)) discloses a technique for preventing an electrode under an upper shield film and an upper insulating layer from being etched to a thinner layer at the time of etching the upper shield film. In order to prevent this inconvenience, a protective film is formed after forming the upper insulating layer, followed by forming the upper shield film. This disclosure indicates that when the upper shield film is etched, the etching of the electrode and the upper insulating layer is prevented.

SUMMARY OF THE INVENTION

With the increasing recording density of magnetic disc apparatuses in recent years, upper and lower gap films are required to be fabricated in thin layers. The upper gap film requires the property of electrically insulating the combination of a magnetoresistive element, a biasing film and an electrode from an upper shield film. Also, the lower gap film is required to have the property of electrically insulating the magnetoresistive element, the biasing film and the electrode from the lower shield film. When the insulation between these parts is insufficient, with conduction occurring between the upper shield film and the magnetoresistive element, the biasing film or the electrode, or between the lower shield film and the magnetoresistive element, the biasing film or the electrode, then the magnetoresistive thin-film magnetic head becomes inoperative.

In the related art, when a magnetoresistive element is formed by ion milling, the surroundings of the magnetoresistive element are overmilled in order to remove the magnetoresistive film completely from the portions other than the magnetoresistive element. This overmilling process causes the lower gap film other than the patterned portion of the magnetoresistive element (that is, the lower gap film existing in a region other than the portion immediately under the magnetoresistive element) to be reduced in thickness with the upper surface thereof scraped off. As a result, according to the related art, it follows that an electrode (including a noise suppression film (hard magnetic film)

depending on the structure of the thin-film magnetic head) is formed in a thin region of the lower gap film, thereby leading to the problem of an insufficient electrical insulation between the electrode and the lower shield film.

In the case where a magnetoresistive film is formed on a magnetic domain controlling film, the upper region of the lower gap film other than the portion thereof immediately under the magnetic domain controlling film is reduced in thickness, with the result that the dielectric strength between the electrode and the lower shield film is reduced in similar fashion.

All of references (1) to (7) described above fail to consider the improvement of the dielectric strength between the lower shield film and the electrode film, and also fail to recognize the above-mentioned first problem that the overmilling reduces the thickness of the upper region of the lower gap film (lower insulating film) other than the portion thereof immediately under the magnetoresistive element (magnetic domain controlling film) between the lower shield film and the electrode film, thereby to reduce the dielectric strength between the electrode and the lower shield film.

In view of this fact, the present inventors have proposed a method in which an insulating layer formed on a thinned portion of the upper region of the lower gap film (lower insulating film), which is different from the portion thereof immediately under the magnetoresistive element (magnetic domain controlling film).

With a magnetic head having a magnetoresistive film formed on a magnetic domain controlling film, an insulating layer, if any, is formed by patterning. At the time of patterning of a magnetic domain controlling film and an insulating layer, a misalignment is likely to occur between the insulating layer and the magnetic domain controlling film. In other words, a gap is likely to occur between an end of the insulating layer formed by the patterning and an opposed end of the magnetic domain controlling film. In that case, the lower gap film under the particular gap is reduced in thickness as the upper surface thereof is scraped off. As a result, when an electrode is provided on the gap portion, the dielectric strength between the electrode and the lower shield film is reduced at the gap, resulting in a leakage current flowing from the electrode to the lower shield film. Consequently, the sense current for reading the signal from the magnetoresistive thin-film magnetic head exhibits a noise or the current flowing in the magnetoresistive element is reduced. The result is a second problem of an insufficient head output.

According to the present invention, there is provided a magnetoresistive thin-film magnetic head and a method of fabricating the magnetic head, which is capable of obviating the first and/or the second problems of the prior art mentioned above.

According to one aspect of the invention, there is provided a magnetoresistive thin-film magnetic head comprising a lower shield film formed on a substrate; a magnetoresistive film for converting a magnetic signal from a magnetic recording medium into an electrical signal using the magnetoresistive effect; a magnetic domain controlling film formed under the magnetoresistive film for controlling the magnetic domain of the magnetoresistive film; an electrode film covering the upper peripheral portion of the magnetoresistive film and supplying a signal detection current to the magnetoresistive film for detecting the converted electrical signal; an upper shield film formed above the electrode film and the magnetoresistive film; an upper insulating film formed between the upper shield film and the combination of the magnetoresistive film and the electrode film for insulating the magnetoresistive film and the electrode film from the upper shield film; a lower insulating film formed between the lower shield film and the combination of the magnetoresistive film, the electrode film and the magnetic domain controlling film for insulating the magnetoresistive film, the electrode film and the magnetic domain controlling film from the lower shield film; and an insulating film formed between the electrode film and the lower insulating film, wherein the upper surface region of the lower insulating film other than the portion immediately, right or just under the magnetic domain controlling film and the upper surface region of the magnetic domain controlling film other than the portion thereof immediately, right or just under the magnetoresistive film are formed in a thin layer at the time of forming the magnetoresistive film by etching, and said insulating layer is formed contiguously over the upper surface region of a thin layer of the lower insulating film and a part of the upper surface region of a thin layer of the magnetic domain controlling film.

In the above-mentioned configuration of a magnetic head comprising a magnetoresistive film formed on a magnetic domain controlling film, the upper surface region of a lower gap film (lower insulating film) reduced in thickness by overmilling other than the portion thereof immediately under the magnetic domain controlling film is covered by an insulating layer, and therefore the dielectric strength between the electrode and the lower shield film is prevented from being reduced, thus solving the first problem described above.

Further, the insulating layer also rides over the upper surface region formed in a thin layer by overmilling of the magnetic domain controlling film. As a result, there is no chance of a gap being created between an end of the insulating layer formed by patterning and an end of the opposed magnetic domain controlling film also formed by patterning, thereby obviating the second problem described above.

Preferably, the insulating layer extends to an end of the magnetoresistive film on the upper surface region formed in a thin layer of the magnetic domain controlling film.

Preferably, the magnetic domain controlling film is formed of an insulating material, whereby the dielectric strength is further improved between the electrode and the lower shield film.

Preferably, the electrode film is in contact with the magnetoresistive film, the insulating layer and the upper insulating film but not in contact with the lower insulating film.

Preferably, the area of the magnetic domain controlling film is larger than that of the magnetoresistive film.

According to the present invention, the combined thickness of the lower insulating film and the insulating layer in the region other than the track portion (the gap region between the opposed electrodes) may be the same as or smaller than the thickness thereof at the track portion as long as the dielectric breakdown can be prevented. The combined thickness of the lower insulating film and the insulating layer at the regions other than the track portion, of course, may be larger than the thickness thereof at the track portion.

Preferably, an edge portion of the lower shield film exists under the electrode film, and the insulating layer is formed also between the edge portion of the lower shield film and the electrode, so that the upper insulating layer and the lower shield film make up a first double-layered structure at the edge portion of the lower shield film.

Preferably, the portion of the upper insulating film between the edge portion of the electrode film and the shield film is constructed of at least two layers to form a second double-layered structure.

This configuration increases the thickness of the insulating layer between the edge portion of the lower shield film and the electrode, and/or the thickness of the insulating layer between the upper shield film and the electrode film, so that the dielectric breakdown is prevented between the particular films.

According to another aspect of the invention, there is provided a magnetoresistive thin-film magnetic head comprising a lower shield film formed on a substrate; a magnetoresistive film for converting a magnetic signal from a magnetic recording medium into an electrical signal using the magnetoresistive effect; a magnetic domain controlling film formed in substantially the same plane as the magnetoresistive film adjacently to the side of the magnetoresistive film for controlling the magnetic domain of the magnetoresistive film; an electrode film covering the upper peripheral portion of the magnetoresistive film and supplying a signal detection current to the magnetoresistive film for detecting the converted electrical signal; an upper shield film formed above the electrode film and the magnetoresistive film; an upper insulating film formed between the upper shield film and the combination of the magnetoresistive film and the electrode film for insulating the magnetoresistive film and the electrode film from the upper shield film; a lower insulating film formed between the upper shield film and the combination of the magnetoresistive film, the electrode film and the magnetic domain controlling film for insulating the magnetoresistive film, the electrode film and the magnetic domain controlling film from the lower shield film; and an insulating layer formed between the electrode film and the lower insulating film, wherein the upper surface region of the lower insulating film other than the portion thereof immediately under the magnetoresistive film is formed in a thin layer at the time of forming the magnetoresistive film by etching, and the insulating layer is formed on the upper surface region formed in a thin layer of the lower insulating film, the magnetic domain controlling film being formed between the electrode and the insulating layer.

In the above-mentioned configuration of a magnetic head comprising a magnetic domain controlling film formed on the extreme side of a magnetoresistive film, the upper surface region of the lower gap film (lower insulating film) that is reduced in thickness by overmilling other than the portion thereof immediately under the magnetoresistive film is covered by an insulating layer. Therefore, the dielectric strength between the electrode and the lower shield film is prevented from being reduced, thereby obviating the first problem described above.

DESCRIPTION OF THE PREFERRED EMBODIMENTS

Figure 1:
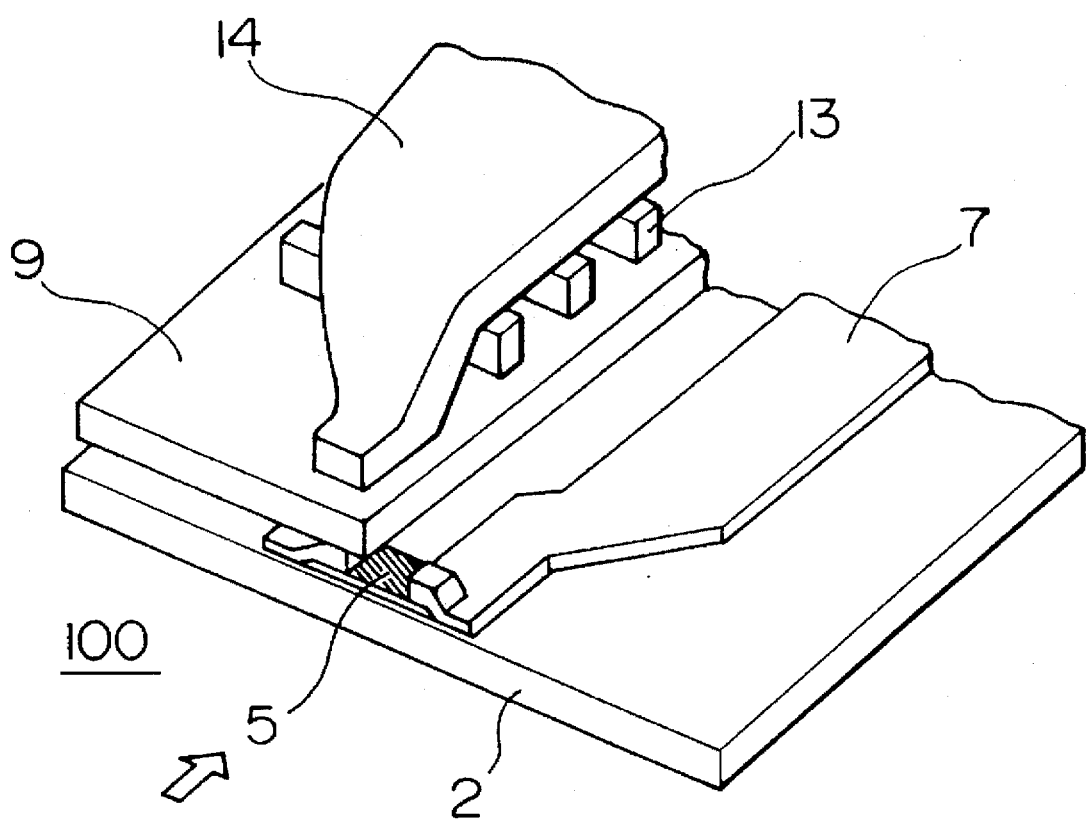
FIG. 1 is a perspective view for explaining the general configuration of a thin-film magnetic head (dual head) according to the present invention.

A magnetoresistive thin-film magnetic head and a method of fabrication thereof according to the invention will be explained below with reference to the accompanying drawings.

In each of the drawings, those component parts having the same functions are designated by the same reference numeral, respectively, and detailed descriptions are thus not repeated.

FIG. 1 is a perspective view for explaining the general configuration of a thin-film magnetic head (dual head) 100 according to the invention. As shown, the thin-film magnetic head comprises a lower-shield film 2, a magnetoresistive element 5, an electrode (with an insulating film formed under an electrode pattern) 7, an upper shield film 9 doubling as a lower core, a coil 13 and an upper core 14. In FIG. 1, the lower insulating film (lower gap film), the upper insulating film (upper gap film), the magnetic domain controlling film (noise-suppression film), the biasing film and the spacer film are not shown for convenience. In FIG. 1, the lower shield film 2, the magnetoresistive element 5, the electrode 7 and the upper shield film 9 make up a read-only head, while the upper shield film 9, the coil 13 and the upper core 1 constitute a write-only head. The invention is aimed at improving the electrical insulation characteristic between the magnetoresistive element 5 and the lower shield film 2 and also the electrical insulation characteristic between the electrode 7 and the lower shield film 2.

Figure 2A:
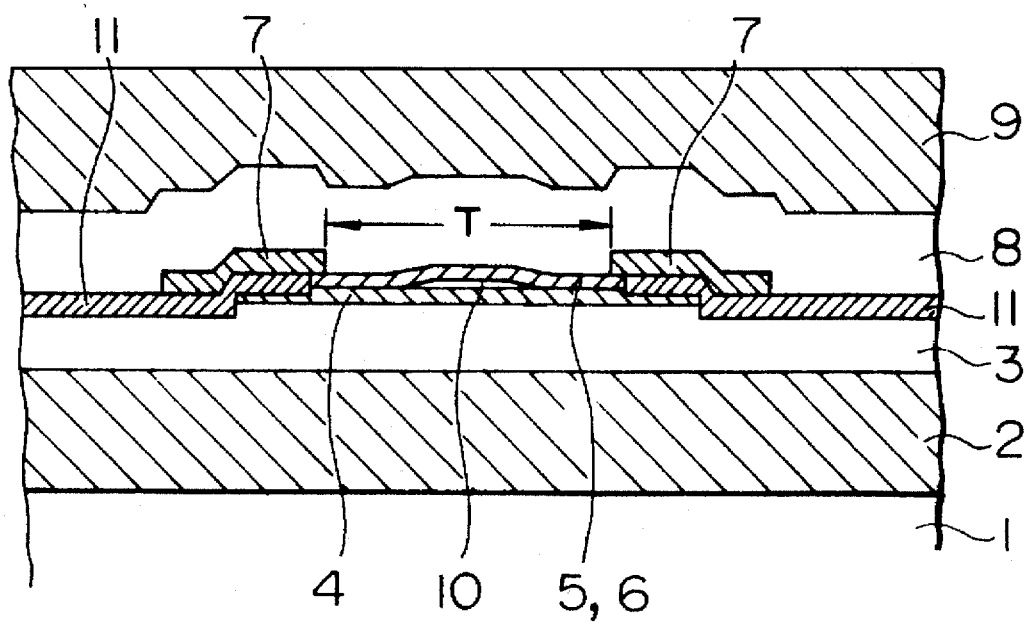
FIG. 2A is a sectional view of the essential parts of a magnetoresistive thin-film magnetic head as taken from the head floating surface thereof according to a first embodiment of the invention.

In the embodiments shown in FIGS. 2A and 10, the upper insulating film and the lower insulating film are called an upper gap film and a lower gap film respectively, and the magnetic domain controlling film is referred to as a noise suppression film.

FIG. 2A is a sectional view for explaining a magnetoresistive thin-film magnetic head according to the first embodiment of the invention as taken from the floating surface of the head along the direction of the arrow shown in FIG. 1.

Figure 3A:
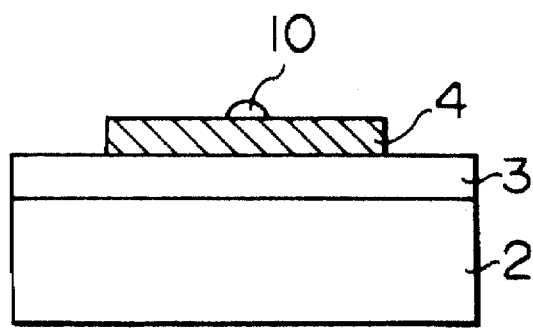
FIGS. 3A to 3D are diagrams showing the pre-process of fabrication of a magnetoresistive thin-film magnetic head according to the first embodiment shown in FIG. 2.
Figure 3C:
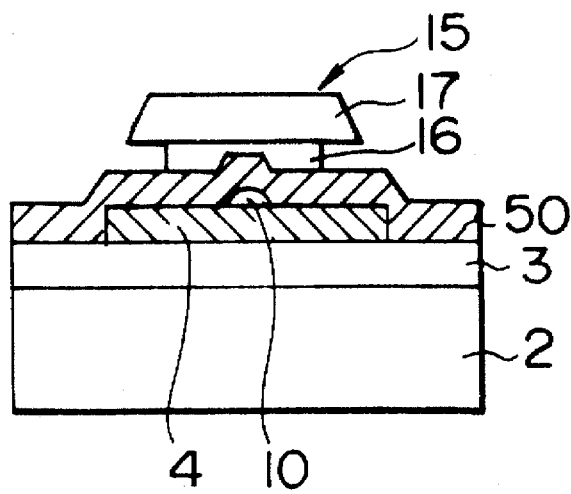
Figure 3B:
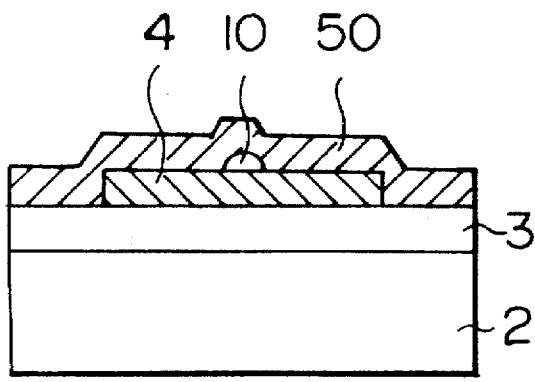
Figure 3D:
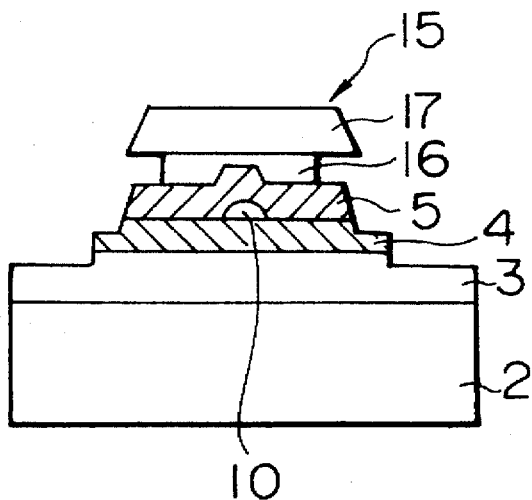
Figure 4A:
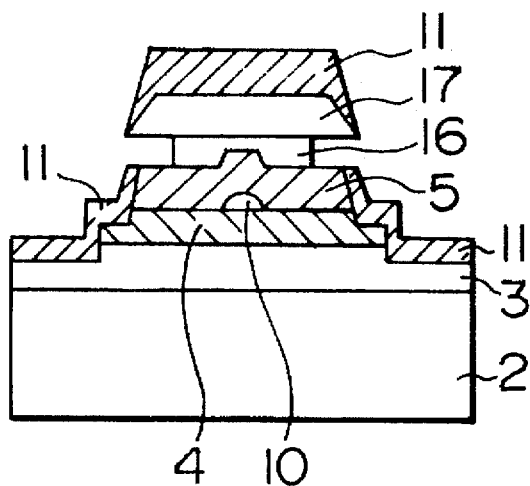
FIGS. 4A to 4C are diagrams showing the post-process of fabrication of a magnetoresistive thin-film magnetic head according to the first embodiment shown in FIG. 2.
Figure 4C:
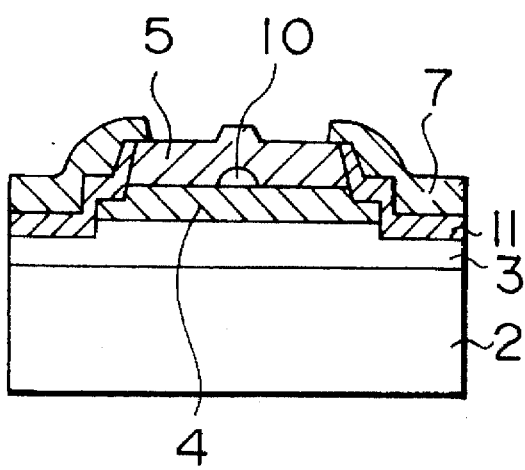
Figure 4B:
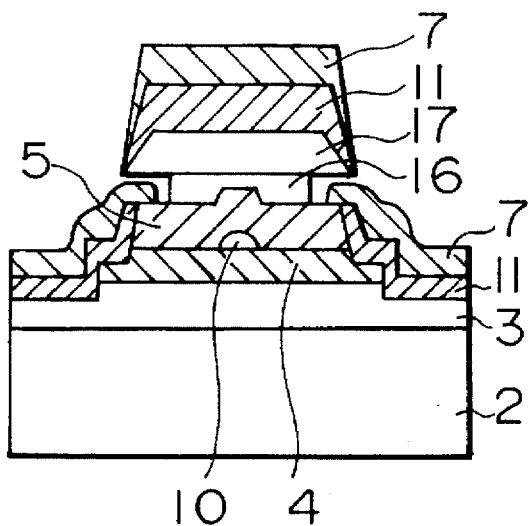

FIGS. 3A to 3D are diagrams showing the pre-process of fabrication of a magnetoresistive thin-film magnetic head according to the first embodiment of FIG. 2A. FIGS. 4A to 4C are diagrams showing the post-process of fabrication of a magnetoresistive thin-film magnetic head according to the first embodiment of FIG. 2A.

As seen from FIG. 2A, in the first embodiment, the magnetoresistive element 5 is located on the noise-suppression film 4 and the spacer film 10. The portion labelled simply as the magnetoresistive element 5 in FIG. 2A normally includes a biasing film 6 (not shown) as well as the magnetoresistive element 5 and a film (not shown) for isolating the magnetoresistive element 5 and the biasing film 6 from each other. In FIG. 2A, an electrode (electrode film) 7 is provided for supplying a sense current to the magnetoresistive element 5. Also, as apparent from FIG. 2A, the noise-suppression film 4, the spacer film 10, the magnetoresistive element 5 (biasing film 6) and the electrode 7 are held between the upper shield film 9 and the lower shield film 2 through the upper gap film 8 and the lower gap film 2, each of which constitutes an electrical insulating film.

The magnetoresistive element 5 is for converting a magnetic signal from a recording medium into an electrical signal using the magnetoresistive effect. The electrode 7 is for supplying a sense current (signal detection current) to the magnetoresistive element 5 for detecting the electrical signal converted.

The noise-suppression film 4 and the magnetoresistive element 5 (biasing film 6) are formed into a pattern by ion milling (etching). In the course of patterning by ion milling, the upper surface region of the lower gap film 3 other than the region immediately, right or just under the noise-suppression film 4 and the upper surface region of the noise-suppression film 4 other than the region immediately, right or just under the element 5 are over-milled to a degree more than required. As a result, the upper surface region of the lower gap film 3 thus over-milled is reduced in thickness during the process of forming the noise-suppression film 4 and the magnetoresistive element 5 (biasing film 6), thereby deteriorating the dielectric strength between the electrode 7 and the lower shield film 2.

In view of these facts, according to the first embodiment of the invention, an insulating film 11 is formed at least on the thinned upper surface region (i.e., the region having a reduced thickness) of the lower gap film 3 to thereby greatly improve the dielectric strength of the particular region where the dielectric strength would otherwise be deteriorated.

The insulating film 11 is formed by patterning. During the patterning process of the noise-suppression film 4 and the insulating film 11, a misalignment may occur between the insulating film 11 and the noise-suppression film 4. In other words, a gap may occur between the end of the insulating film 11 formed by patterning and the end of the noise-suppression film 4 in opposed relation to the end of the insulating film 11. In such a case, the lower gap film 3 under the gap is reduced in thickness with the upper surface thereof scraped off during the patterning process. When the electrode 7 is arranged in the gap, therefore, the dielectric strength between the electrode 7 and the lower shield film 2 at the particular gap portion is reduced, so that a leakage current flows from the electrode to the lower shield film 2. Consequently, noise occurs in the sense current for reading signals from the magnetoresistive thin-film magnetic head, or the current flowing in the magnetoresistive element 5 is reduced, resulting in an insufficient head output.

In view of this, according to the present embodiment, in order to prevent any such gap from occurring, the end of the insulating film 11 is constructed in such a form as to ride over the opposed end of the noise-suppression film 4, which has been reduced in thickness by overmilling.

Now, the fabrication process of the above-mentioned magnetoresistive thin-film magnetic head according to the first embodiment will be explained with reference to FIGS. 3A to 3D and FIGS. 4A to 4C. FIGS. 3A to 3D are diagrams showing the pre-process of fabrication. Specifically, FIG. 3A is a diagram showing that a lower gap film 3, a noise-suppression film 4 and a spacer film 10 are patterned on a lower shield film 2. FIG. 3B is a diagram showing that a magnetoresistive film (including a bias film) 50 is formed on spacer film 10. In FIG. 3C, a resist pattern 15 is formed by the lift-off method in a region of the magnetoresistive film 50 left as the magnetoresistive element 5. The resist pattern 15 has two layers of resists 15, 16. The resist 16 has an undercut formed therein (the resist 17 is constructed in a form like an open umbrella). FIG. 3D shows the state in which the magnetoresistive film 50 not covered by the resist pattern 15 formed by the lift-off method is removed by ion milling.

As is clear from FIG. 3D, when the magnetoresistive film 50 is removed by ion milling, the upper surface region of the noise-suppression film 4 other than the portion immediately under the serving portion of the magnetoresistive film 50, and the upper surface region of the lower gap film 3 other than the portion immediately under the noise-suppression film 4, are reduced in thickness by overmilling.

FIGS. 4A to 4C are diagrams showing the post-process of fabrication. Specifically, FIG. 4A shows the state in which an insulating film 11 providing an essential part of the invention is formed. The insulating film 11 is formed by sputtering or vapor deposition using the resist pattern 15 formed by the lift-off method.

As seen in FIG. 4A, the insulating film 11 is formed in such a manner as to cover an overmilled upper surface region of the lower gap film 3 and an overmilled upper surface region of the noise-suppression film 4. According to the embodiment under consideration, the insulating film 11 thus extends to the ends of the magnetoresistive element 5.

In forming the insulating film 11 in such a manner as to extend to the ends of the magnetoresistive element 5, instead of the resist pattern used with FIGS. 3C and 3D, a resist pattern slightly smaller than the resist pattern used in FIGS. 3C and 3D may be used.

FIG. 4B shows the state in which an electrode 7 is formed by the lift-off method. The electrode 7 may alternatively be formed by ion milling after removing the resist pattern 15 and forming an electrode film. FIG. 4C shows the state in which the resist pattern 15 formed by the lift-off method is removed together with the electrode film 7 and the insulating film 11 formed on the resist pattern 15. As a result of this process, the lower gap film 3 (reduced in thickness by over-milling) and the insulating film 11 formed during the present process coexist between the electrode 7 and the lower shield film 2, thereby making it possible to fabricate a magnetoresistive thin-film magnetic head that is high in dielectric strength.

As described above, according to this embodiment, the insulating film 11 is formed in such a way as to ride over the overmilled upper surface region of the noise-suppression film 4. Therefore, there is no possibility of a gap being formed between an end of the insulating film 11 and the opposed end of the noise-suppression film 4. The above-mentioned problems thus can be prevented.

The insulating film 11 formed during the present process has a sufficient thickness to maintain a sufficient dielectric strength between the electrode 7 and the lower shield film 3 as long as there is no processing problem.

According to the first embodiment described above, the insulating film 11 is formed over the entire surface of the noise-suppression film 4 reduced in thickness by overmilling. The present invention, however, is not limited to such an embodiment, and the insulating film 11 may be formed on a part of the upper surface region with reduced thickness of the noise-suppression film 4. This is due to the fact that the noise-suppression film 4 has an insulation characteristic.

Figure 2B:
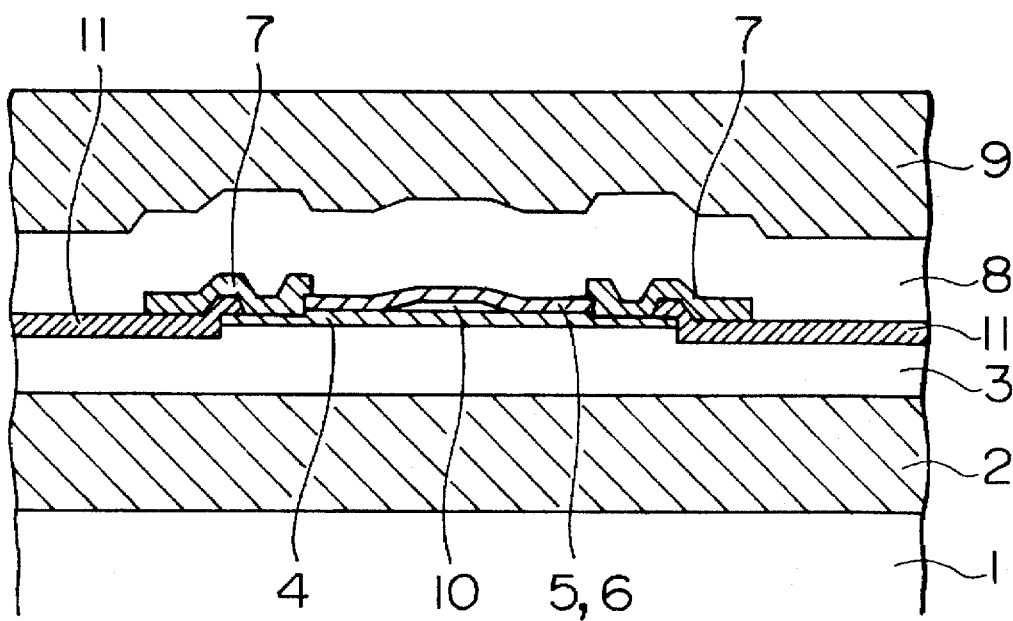
FIG. 2B is a sectional view showing the essential parts of a modification of a magnetoresistive thin-film magnetic head according to the first embodiment shown in FIG. 2A.

FIG. 2B shows the essential parts of a magnetoresistive thin-film magnetic head constructed as described above. In FIG. 2B, the same component parts as in FIG. 2A are designated by the same reference numerals respectively, and will not be described again. In the modification shown in FIG. 2B, the insulating film 11 is formed to ride over only part of the upper surface region formed with a reduced thickness of the noise-suppression film 4, i.e., over the peripheral portion of the noise-suppression film 4.

The head of FIG. 2B is formed in a similar manner to the head of FIG. 2A. In forming the insulating film 11, however, the resist pattern included in FIGS. 3C, 3D can be directly used.

Figure 5:
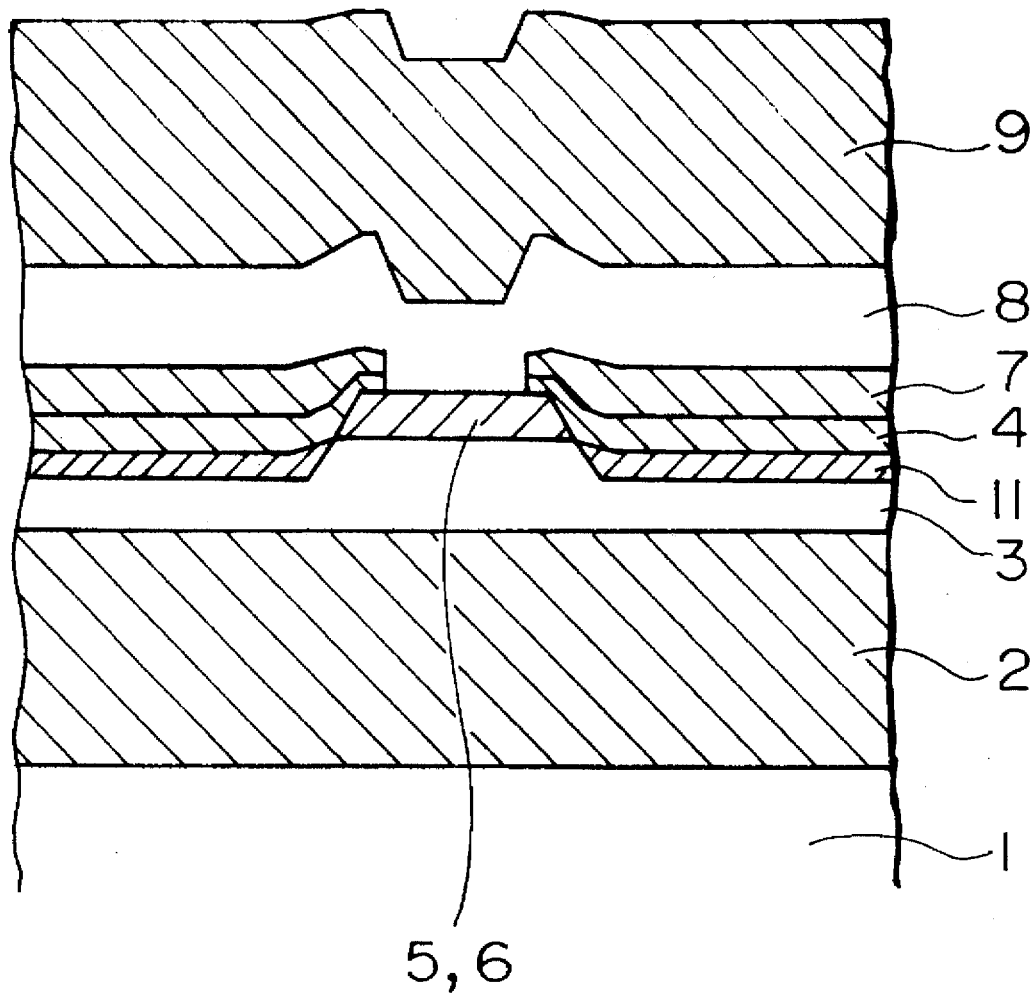
FIG. 5 is a sectional view of the essential parts of a magnetoresistive thin-film magnetic head as taken from the head floating surface thereof according to a second embodiment of the invention.

FIG. 5 is a sectional view for explaining the essential parts of a magnetoresistive thin-film magnetic head according to a second embodiment of the invention as seen from the floating surface of the head. FIGS. 6A to 6E are diagrams showing the pre-process of fabrication of a magnetoresistive thin-film magnetic head according to the second embodiment shown in FIG. 5. FIGS. 7A to 7E are diagrams showing the post-process of fabrication of a magnetoresistive thin-film magnetic head according to the second embodiment shown in FIG. 5.

As seen in FIG. 5, according to the second embodiment, the magnetoresistive element 5 exists only at the portion corresponding to the tracks provided on a magnetic recording medium (magnetic disk). The noise-suppression film 4 and the electrode 7 are located in overlapped relation with each other on the two sides of the magnetoresistive element 5. As in FIGS. 2A and 2B, the magnetoresistive element 5 is shown without any components thereof. The portion designated as the magnetoresistive element 5, however, is normally composed of the magnetoresistive element 5, a biasing film 6 (not shown) and a film (not shown) for isolating the magnetoresistive element 5 and the biasing film 6 from each other.

According to this embodiment, the noise-suppression film 4 controls the magnetic domain of the magnetoresistive element 5 from the side thereof, and supplies a sense current (signal read current) from the electrode 7 to the magnetoresistive element 5 through the noise-suppression film 4.

The magnetoresistive element 5 (biasing film 6), the noise-suppression film 4 and the electrode 7 are held between the upper shield film 9 and the lower shield film 2 through the upper gap film 8 and the lower gap film 3.

According to the second embodiment, like the first embodiment, the magnetoresistive element 5 is formed by ion milling using a resist pattern formed by the lift-off method. In the process, the upper surface region of the lower gap film 3 other than the region immediately below the magnetoresistive element 5 is overmilled. As a result, the overmilled upper surface region of the lower gap film 3 is reduced in thickness thereby to reduce the dielectric strength.

In view of this, according to the second embodiment, before forming the noise-suppression film 4 and the electrode 7, an insulating film 11 is formed, and the region of the lower gap film 3 that was reduced in thickness by overmilling is increased in thickness by means of the insulating film 11, thereby improving the dielectric strength between the noise-suppression film 4 (electrode 7) and the lower shield film 2.

According to the embodiment under consideration, the magnetic domain of the magnetoresistive element 5 is controlled by the noise-suppression film 4 from the side of the magnetoresistive element 5. Therefore, the insulating film 11 does not ride over the magnetoresistive element 5 and is formed only on the overmilled upper region of the lower-gap film 3.

Figure 6A:
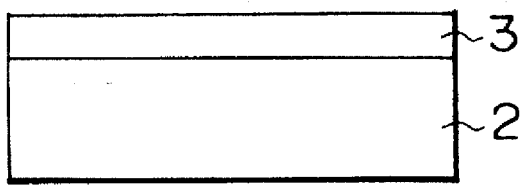
FIGS. 6A to 6E are diagrams showing the pre-process of fabrication of a magnetoresistive thin-film magnetic head according to the second embodiment shown in FIG. 5.
Figure 6D:
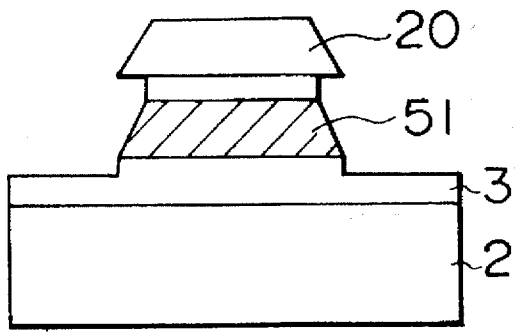
Figure 6B:
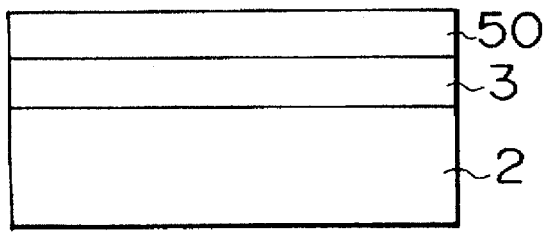
Figure 6E:
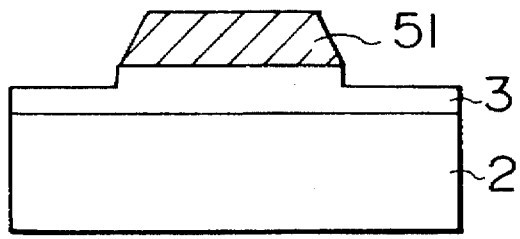
Figure 6C:
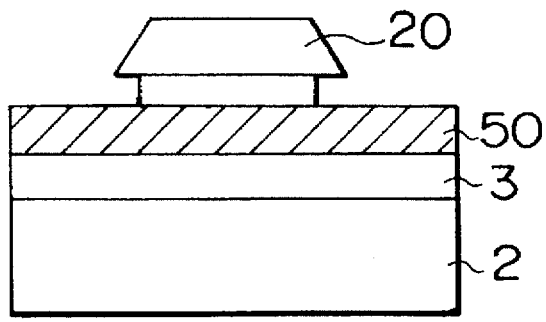

The fabrication process of a magnetoresistive thin-film magnetic head according to the second embodiment will be explained with reference to FIGS. 6A to 6E and 7A to 7E. FIGS. 6A to 6E are diagrams showing the pre-process of fabrication, of which FIG. 6A is a diagram showing the state in which the lower gap film 3 is formed on the lower shield film 2. FIG. 6B is a diagram showing the state in which the magnetoresistive film 50 is formed. As shown in FIG. 6C, a resist pattern 20 is formed by the lift-off method in such a manner as to leave the pattern of the magnetoresistive film 50 on a part of the electrode pattern and the portion corresponding to the tracks. As shown in FIG. 6D, an intermediate pattern 51 of the magnetoresistive element 5 is formed by milling. The resist pattern 20 has a region wider than the portion corresponding to the tracks. The portion of the resist pattern 20 corresponding to the track and the dimension thereof in the vertical direction are determined as a portion of a dimension left finally as a magnetoresistive film. Also, whenever required, an insulating film is formed after milling in order to improve the dielectric strength of the portion of the lower gap film 3 that is removed by overmilling. After that, as shown in FIG. 6E, the resist pattern 20 is removed.

Figure 7A:
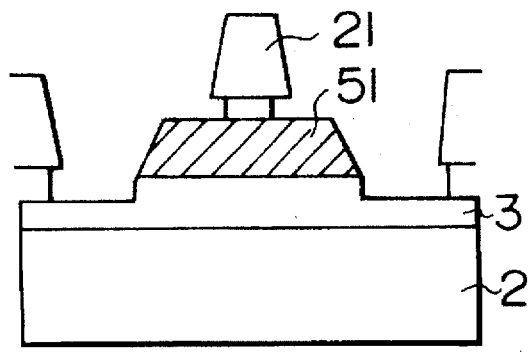
FIGS. 7A to 7E are diagrams showing the post-process of fabrication of a magnetoresistive thin-film magnetic head according to the second embodiment shown in FIG. 5.

FIGS. 7A to 7E are diagrams showing the post-process of fabrication. Specifically, FIG. 7A shows the state in which a resist pattern (by the lift-off method) 21 of the electrode is formed.

Figure 7D:
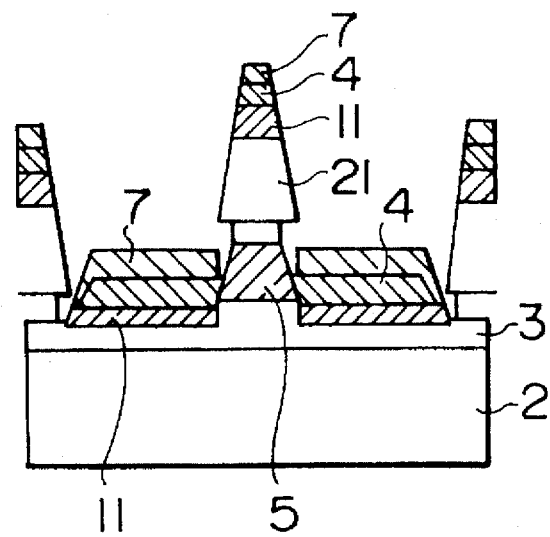
Figure 7B:
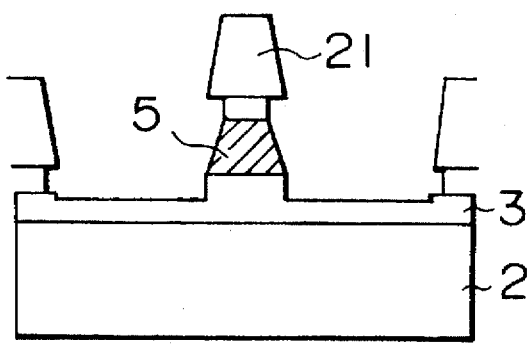
Figure 7E:
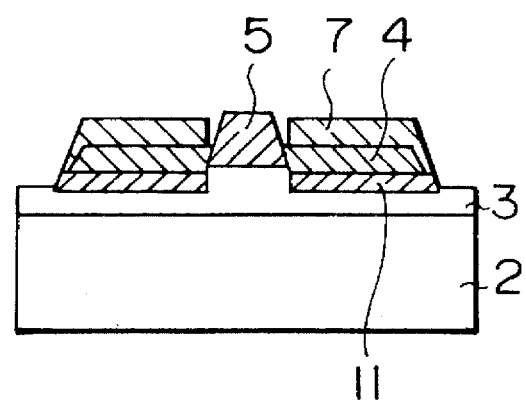
Figure 7C:
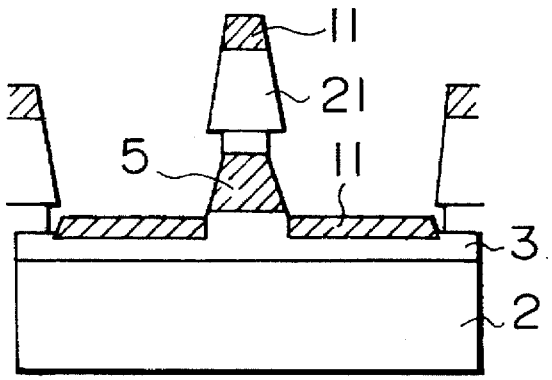

FIG. 7B shows the state in which an intermediate pattern 51 of the magnetoresistive film other than the portion corresponding to the tracks is removed by ion milling. In the process, there is some region where the lower shield film 3 is reduced in thickness by overmilling. FIG. 7C is a diagram showing the state in which the insulating film 11 is formed by vapor deposition or sputtering in order to improve the dielectric strength of the region of the lower shield film 3 that is reduced in thickness. As the next step, in order to reduce the electrical contact resistance between the magnetoresistive element 5 and the combination of the electrode and the noise-suppression film formed in the next process, the cleaning is performed by ion milling or ion beam. FIG. 7D is a diagram showing the state in which the noise-suppression film 4 and the electrode (film) 7 are formed. Finally, as shown in FIG. 7E, the resist pattern 21 is removed together with the electrode film and the noise-suppression film attached on the resist pattern 21 to the dimension substantially equivalent to the portion corresponding to the tracks.

The insulating film 11 formed during the present process has a sufficient thickness to maintain a sufficient dielectric strength between the noise-suppression film 4 or the electrode 7 and the lower shield film 3 as long as there is posed no processing problem.

According to the second embodiment described above, the resist pattern 20 is formed followed by the intermediate pattern 51 of the magnetoresistive element 5 being formed by ion milling. The invention, however, is not limited to such a process; the portion of the magnetoresistive element 5 corresponding to the tracks may be formed directly by ion milling without forming the intermediate pattern 51.

Also, according to the above-mentioned second embodiment, the noise-suppression film 4 is formed on the insulating film 11 and the electrode 7 is formed on the noise-insulating film 4. The invention, however, is not limited to such a process; the insulating film 11 may be formed on the noise-suppression film 4 with the electrode 7 formed on the insulating film 11.

Further, according to the above-mentioned second embodiment, the noise-suppression film 4 is formed on the insulating film 11. The noise-suppression film 4 is not always required to be formed, however; only the electrode 7 may be formed.

Figure 8:
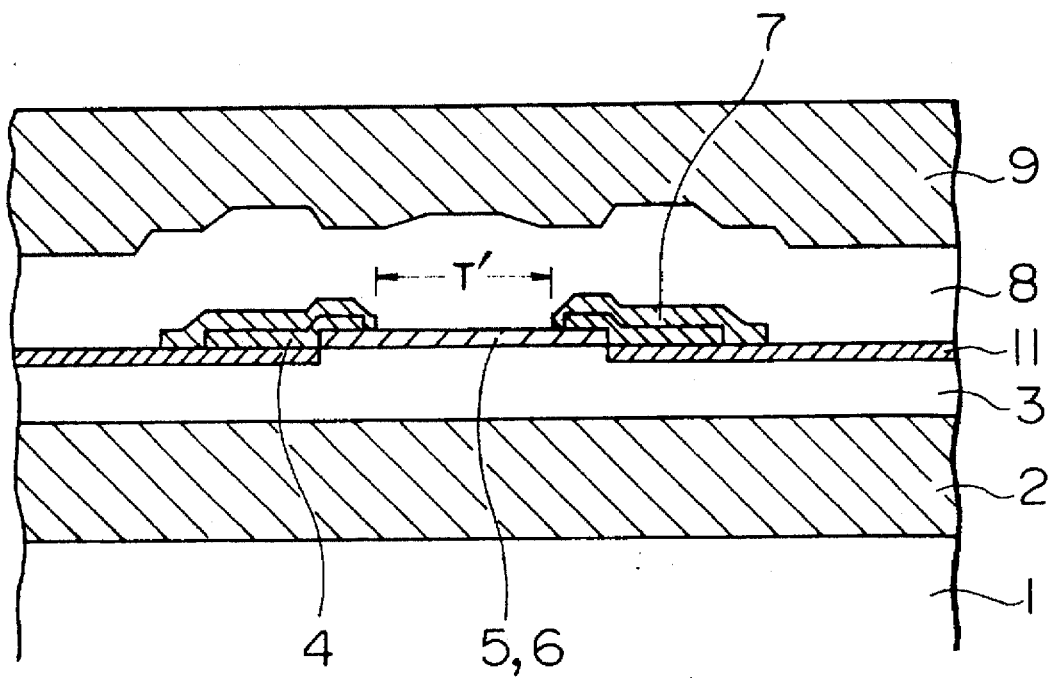
FIG. 8 is a sectional view of the essential parts of a magnetoresistive thin-film magnetic head as taken from the head floating surface according to a third embodiment of the invention.

FIG. 8 is a sectional view for explaining the essential parts of a magnetoresistive thin-film magnetic head as taken from the floating surface of the head according to a third embodiment of the invention. FIGS. 9A to 9D are diagrams showing the pre-process of fabrication of a magnetoresistive thin-film magnetic head according to the third embodiment shown in FIG. 8. FIGS. 10A to 10D are diagrams showing the post-process of fabrication of a magnetoresistive thin-film magnetic head according to the third embodiment shown in FIG. 8.

As is apparent from FIG. 8, according to the third embodiment, like in the second embodiment, the noise-suppression film 4 and the electrode 7 are arranged to be overlapped one on the other on the two sides of the magnetoresistive element 5. The third embodiment, however, is so constructed that the noise-suppression film 4 and the electrode 7 ride over the magnetoresistive element 5 (including the biasing film 6). In the process, the magnetoresistive element 5 is formed by ion milling. When the magnetoresistive element 5 is formed by ion milling, the portion of the lower gap film 3 other than that immediately under the magnetoresistive element 5 is overmilled thereby to reduce the thickness of the lower gap film 3.

In third embodiment as shown in FIG. 8, the insulating film 11 is formed in a region other than the portion immediately under the magnetoresistive element 5, so that the dielectric strength between the lower shield film 2 and the combination of the noise-suppression film 4 and the electrode 7 is improved.

Figure 9A:
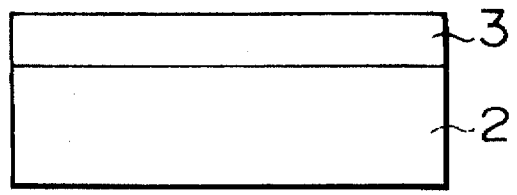
FIGS. 9A to 9D are diagrams showing the pre-process of fabrication of a magnetoresistive thin-film magnetic head according to the third embodiment shown in FIG. 8.
Figure 9C:
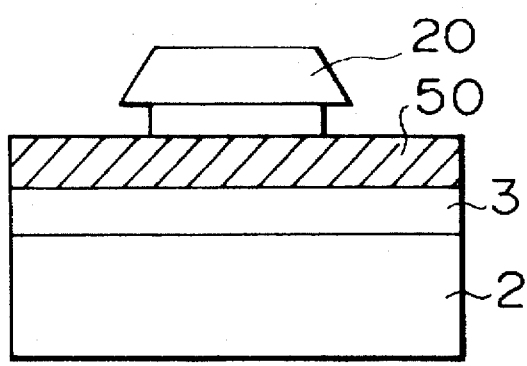
Figure 9B:
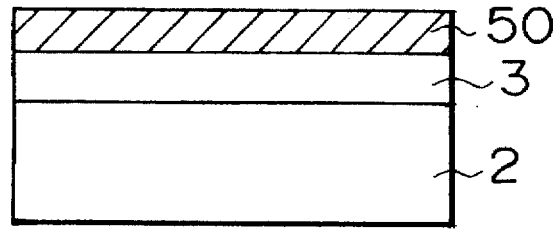
Figure 9D:
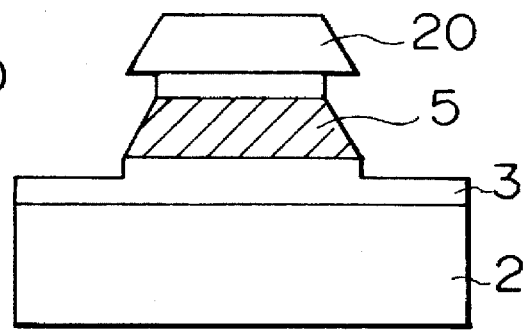

Now, the fabrication process of a magnetoresistive thin-film magnetic head according to the third embodiment will be explained with reference to FIGS. 9A to 9D and 10A to 10D. FIGS. 9A to 9D are diagrams showing the pre-process of fabrication. The pre-process shown in FIGS. 9A to 9D is identical to the pre-process shown in FIGS. 6A to 6D according to the second embodiment and will not be explained further. In FIG. 9C, however, a resist pattern 20 is formed by the lift-off method in such a manner as to leave the pattern of the magnetoresistive film 50 on a region larger than the portion corresponding to the tracks (T' in FIG. 8), followed by forming the final pattern of the magnetoresistive element 5 by milling using the particular resist pattern.(FIG. 9D). As a result, in FIG. 9D, the final magnetoresistive element 5 larger than the portion corresponding to the tracks is formed by ion milling. According to the second embodiment, on the other hand, the intermediate pattern 51 of the magnetoresistive element 5, is formed at the step of of FIG. 6D, after which the step of FIG. 7B produces the final pattern 5 having a width substantially equal to the track width, by ion milling.

Figure 10A:
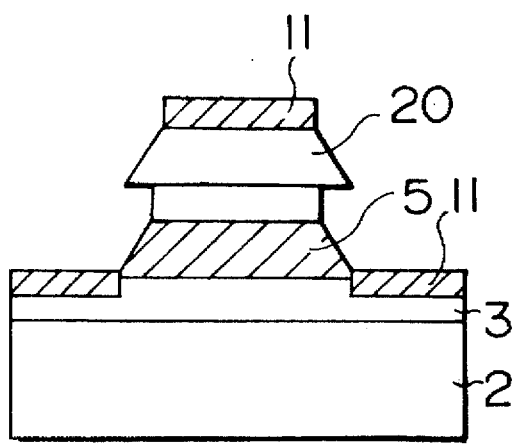
FIGS. 10A to 10D are diagrams showing the post-process of fabrication of a magnetoresistive thin-film magnetic head according to the third embodiment shown in FIG. 8.
Figure 10C:
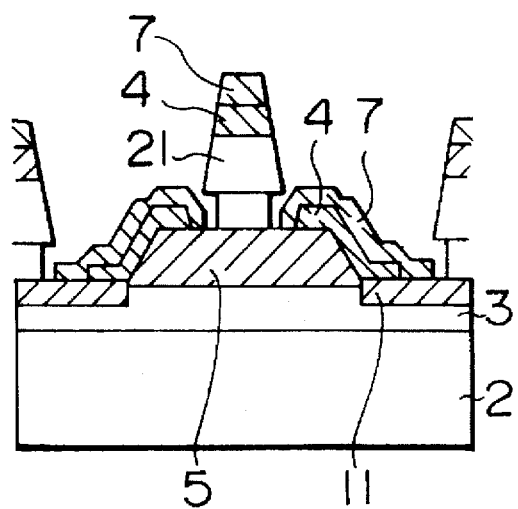
Figure 10B:
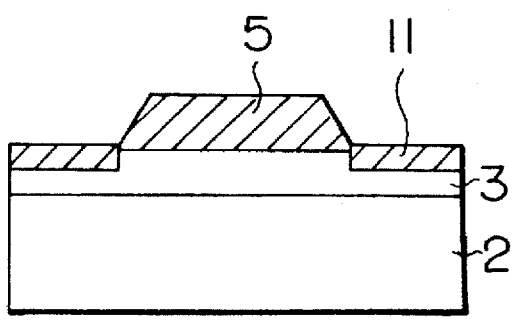
Figure 10D:
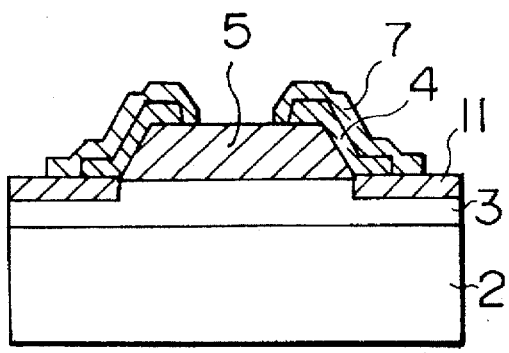

FIGS. 10A to 10D are diagrams showing the post-process of fabrication. Specifically, FIG. 10A shows the state in which the insulating film 11 is formed, followed by removing the resist pattern 20 by the lift-off method as shown in FIG. 10B. After that, as shown in FIGS. 10C and 10D, the resist pattern 21 (having a dimension corresponding to the tracks) is formed by the lift-off method thereby to form the noise-suppression film 4 and the electrode 7. The noise-suppression film 4 and the electrode 7 may alternatively be formed by the ion-milling process.

As a result, according to the present embodiment, a configuration is obtained in which the noise-suppression film 4 and the electrode 7 ride over the magnetoresistive element 5.

The insulating film 11 formed during the process under consideration has a sufficient thickness to maintain a sufficient dielectric strength between the noise-suppression film 4 or the electrode 7 and the lower shield film 3, as long as no processing problem is imposed.

According to the third embodiment described above, the noise-suppression film 4 is formed over the insulating film 11 and the ends of the magnetoresistive element 5. It is, however, not always necessary to form the noise-suppression film 4, but only the electrode 7 is required.

According to each embodiment of the invention described above, during the formation of a magnetoresistive element, an insulating film is formed over a lower gap film that is reduced in thickness by overmilling and/or over a film associated with the lower gap film. As a result, the dielectric strength is remarkably improved between the electrode (the noise-suppression film and the electrode) and the lower shield film of a magnetoresistive thin-film magnetic head.

Figure 11A:
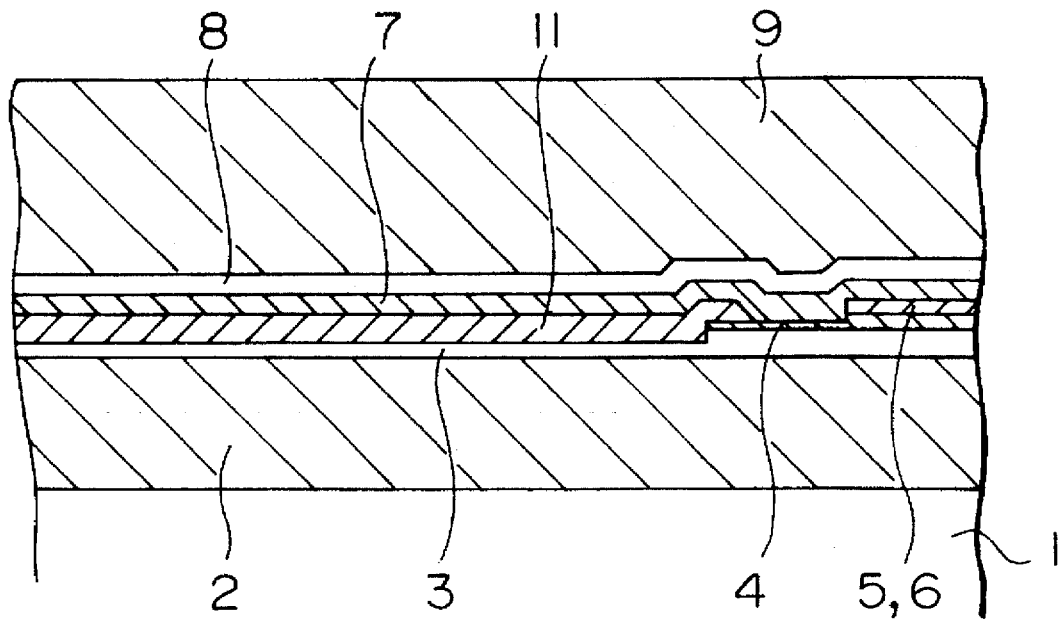
FIG. 11A is a sectional view of the essential parts of a magnetoresistive thin-film magnetic head as taken in the direction orthogonal to the floating surface of the head according to the first embodiment.

FIG. 11A is a sectional view showing the essential parts of a magnetoresistive thin-film magnetic head according to a fourth embodiment as seen in the direction orthogonal to the floating surface F. In FIG. 11A, numeral 1 designates a substrate, numeral 2 a lower shield film, numeral 3 a first insulating film (corresponding to the lower insulating film described above), numeral 4 an insulating magnetic domain controlling film, numeral 5 a magnetoresistive film, numeral 11 a protective insulating film for improving the dielectric strength between the magnetoresistive film and the shield film, numeral 7 an electrode film, numeral 8 a second insulating film (corresponding to the upper insulating film described above) and numeral 9 an upper shield film.

The lower gap film 3, the noise-suppression film 4, the electrode 7, the upper gap film 8 and the insulating film 11 in the first to third embodiments are called the first insulating film (lower insulating film) 3, the magnetic domain controlling film (insulating magnetic domain controlling film) 4, the electrode film 7, the second insulating film (upper insulating film) 8 and the protective insulating film 11, respectively, in the fourth to sixth embodiments. Also, in the fourth to sixth embodiments, the biasing film 6 and the spacer film 10 in the first to third embodiments are not shown but may be included as in the first to third embodiments.

As is clear from FIG. 11A, the insulating magnetic domain controlling film 4 is provided on the floating surface side of the first insulating film 3. Further, the protective insulating film 11 is formed on the first insulating film 3 in such a position as to ride over the ends of the insulating magnetic domain controlling film 4. A magnetoresistive film 5 is deposited on the floating surface side of the insulating magnetic domain controlling film 4.

More specifically, according to the fourth embodiment, there is provided a magnetoresistive thin-film magnetic head that is superior in dielectric strength, wherein when the insulating magnetic domain controlling film 4 is provided on the first insulating film 3 over the lower shield film 2, an area larger than the magnetoresistive film 5 is secured for the insulating magnetic domain controlling film 4, and also when an insulating film serving as a protective insulating film 11 is deposited under the electrode 7, the protective insulating film 11 is caused to ride over the ends of the insulating magnetic domain controlling film 4.

The embodiment under consideration has a similar configuration to the configuration of FIG. 2B (a modification of the first embodiment). As in FIG. 2B, when a pattern of the magnetoresistive element 5 is formed by ion milling (patterning technique), the upper surface region of the first insulating film 3 other than the portion thereof immediately under the magnetic domain controlling film 4 is overmilled. As a result, the insulating film 11 is formed on the upper surface region of the first insulating film 3 that has been reduced in thickness by overmilling. Further, the insulating film 11 is provided in such a position as to ride over a part of the upper surface region of the magnetic domain controlling film 4 that is reduced in thickness, i.e., over the peripheral portion of the magnetic domain controlling film 4. Consequently, the embodiment also produces an effect similar to the embodiment of FIG. 2A and the modification of FIG. 2B.

FIGS. 12A to 16B are diagrams for explaining a method of fabricating a magnetoresistive thin-film magnetic head according to the fourth embodiment. Of FIGS. 12A to 16B, the diagrams of FIGS. 12A, 13A, 14A, 15A, 16A are sectional views as taken from the floating surface F of the head, and FIGS. 12B, 13B, 14B, 15B, 16B are plan views thereof respectively.

As described above, when the magnetoresistive element 5 is formed as a pattern by ion milling (patterning technique), the upper surface region of the first insulating film 3 other than the portion thereof immediately under the magnetic domain controlling film 4 is reduced in thickness by overmilling. Further, the upper surface region of the magnetic domain controlling film 4 other than the portion thereof immediately under the magnetoresistive element 5 is also reduced in thickness by overmilling. For simplicity of the drawings, the first insulating film 3 and the magnetic domain controlling film 4 are shown to have a uniform thickness in FIGS. 12A to 16B. Actually, however, the overmilled region of these films is reduced in thickness.

Figure 12A:
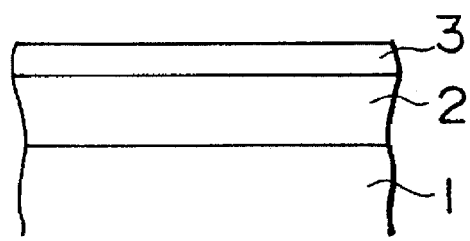
FIGS. 12A to 12B are diagrams showing a method of fabricating a magnetoresistive thin-film magnetic head according to the fourth embodiment of FIG. 11A.
Figure 12B:
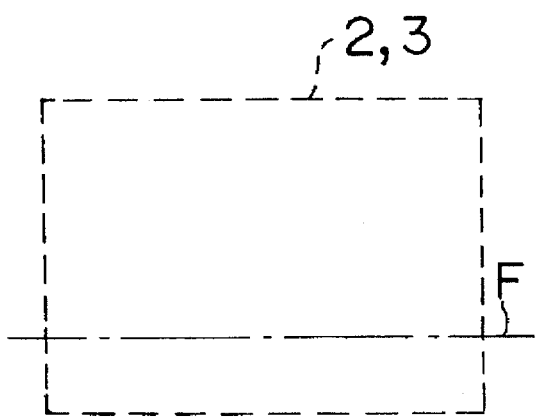

As shown in FIGS. 12A, 12B, first, a several Nm-thick lower shield film 2 made of a magnetic film of Ni—Fe alloy, etc., is formed on a non-magnetic substrate formed of alumina or the like. Then, a first insulating film 3 made of alumina or the like is formed by such means as sputtering, vapor deposition, plating or CVD (chemical vapor deposition) to the thickness of 0.05 to 0.3 μm. When required, the first insulating film 3 may be processed in flat form with a polisher or the like. The effect of the invention becomes more conspicuous with a specimen that is specially processed.

Figure 13A:
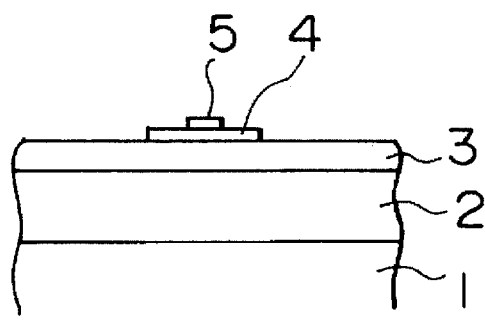
FIGS. 13A to 13B are diagrams showing a method of fabricating a magnetoresistive thin-film magnetic head according to the fourth embodiment of FIG. 11A.
Figure 13B:
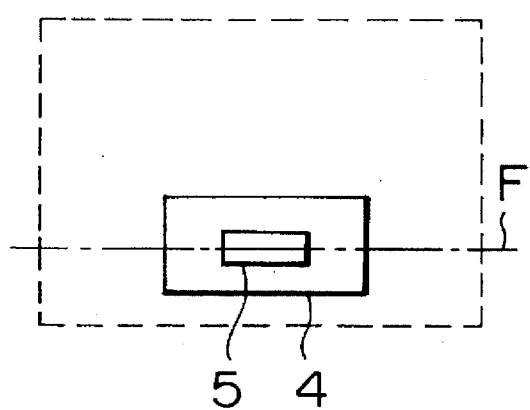

As the next step, as shown in FIGS. 13A, 13B, an insulating magnetic domain controlling film 4 made of NiO, CuO or the like, and a magnetoresistive film 5 made of several layers of Ni—Fe or the like are formed on the first insulating film 3 as a pattern by such means as sputtering, vapor deposition, plating or CVD through the appropriate patterning process. As seen from FIGS. 13A and 13B, the patterning process is performed in such a manner that the area of the magnetic domain controlling film 4 is larger than that of the magnetoresistive film 5 and that the magnetoresistive film 5 is deposited over the entire surface of the magnetic domain controlling film 4. Also, though not shown with this embodiment, another film (such as a spacer film) for defining the range of controlling the magnetic domain of the magnetoresistive film may be formed on a part of the contact area between the magnetic domain controlling film 4 and the magnetoresistive film 5, i.e., partially between the magnetic domain controlling film 4 and the magnetoresistive film 5.

Figure 14A:
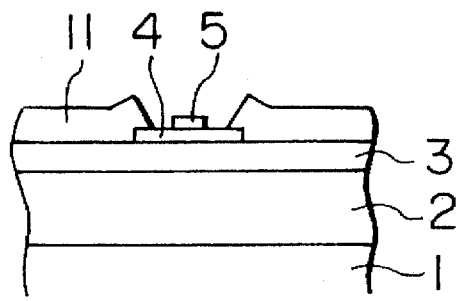
FIGS. 14A to 14B are diagrams showing a method of fabricating a magnetoresistive thin-film magnetic head according to the fourth embodiment of FIG. 11A.
Figure 14B:
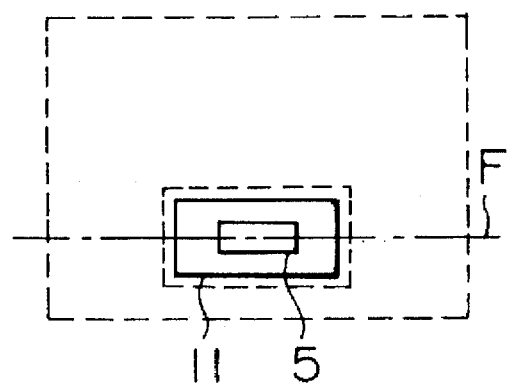

Then, as shown in FIGS. 14A, 14B, in order to improve the dielectric strength, a protective insulating film 11 of alumina or like material is formed in such a position as to ride over the ends of the insulating magnetic domain controlling film 4 as a pattern by sputtering, vapor deposition, plating, CVD or like means through the appropriate patterning process. The patterning process is performed as described above in such a manner that the protective insulating film 11 rides over the ends of the insulating magnetic domain controlling film 4, but without reaching the ends of the magnetoresistive film 5. In the process, it is necessary to determine the amount by which the protective insulating film 11 rides over the insulating magnetic domain controlling film 4 and the distance between the protective insulating film 11 and the magnetoresistive film 5, taking into consideration the amount of exposure misalignment of the photo pattern.

Also, the above-mentioned lift-off method is desirably adopted for patterning. In other words, first, a resist pattern of what is called a "mushroom-shaped" type having a flange at the upper part thereof, is formed in such a shape as to cover the entire surface of the magnetoresistive film 5 and the insulating magnetic domain controlling film 4 in the vicinity of the magnetoresistive film 5. Then, an insulating film is formed by sputtering, vapor deposition, plating, CVD or the like means, the portion of the insulating film on the resist pattern is removed, and the resist pattern is removed. According to this method, damage to the insulating magnetic domain controlling film 4 providing a base is minimal. Further, since the resist pattern has a flange portion as described above, a gentle slope can be provided to the patterning ends of the protective insulating film 11 thus formed.

Figure 15A:
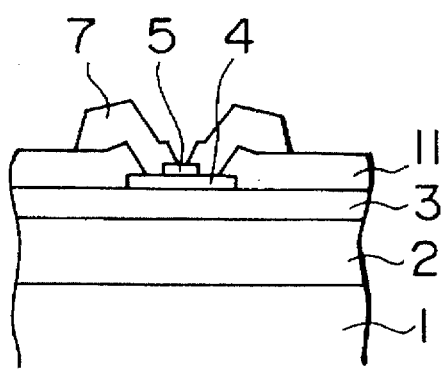
FIGS. 15A to 15B are diagrams showing a method of fabricating a magnetoresistive thin-film magnetic head according to the fourth embodiment of FIG. 11A.
Figure 15B:
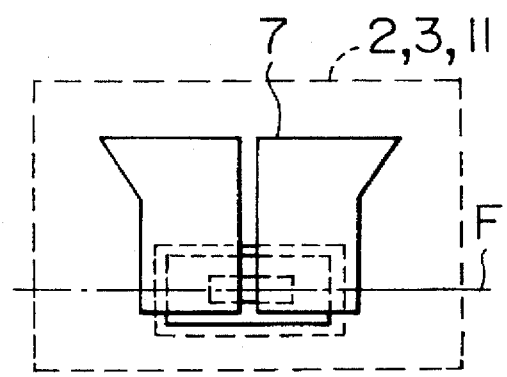
Figure 16A:
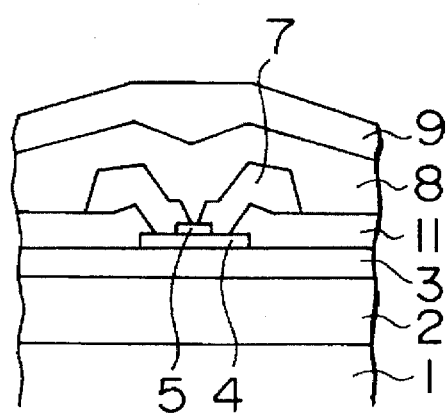
FIGS. 16A to 16B are diagrams showing a method of fabricating a magnetoresistive thin-film magnetic head according to the fourth embodiment of FIG. 11A.
Figure 16B:
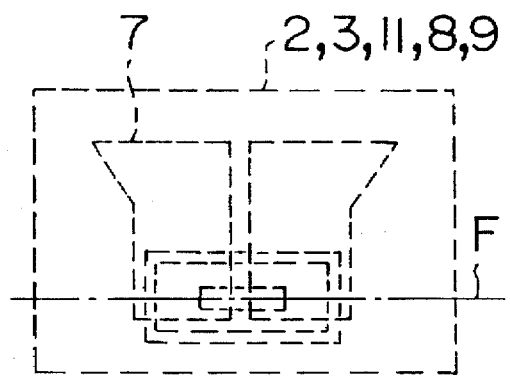

In the next step, as shown in FIGS. 15A, 15B, an electrode film 7 is formed by such means as sputtering, vapor deposition, plating or CVD as a pattern. Further, as shown in FIGS. 16A, 16B, a second insulating film 8 made of alumina or like material and an upper shield film 9 made of a magnetic film of Ni—Fe alloy or the like are formed by such means as sputtering, vapor deposition, plating or CVD.

Figure 11B:
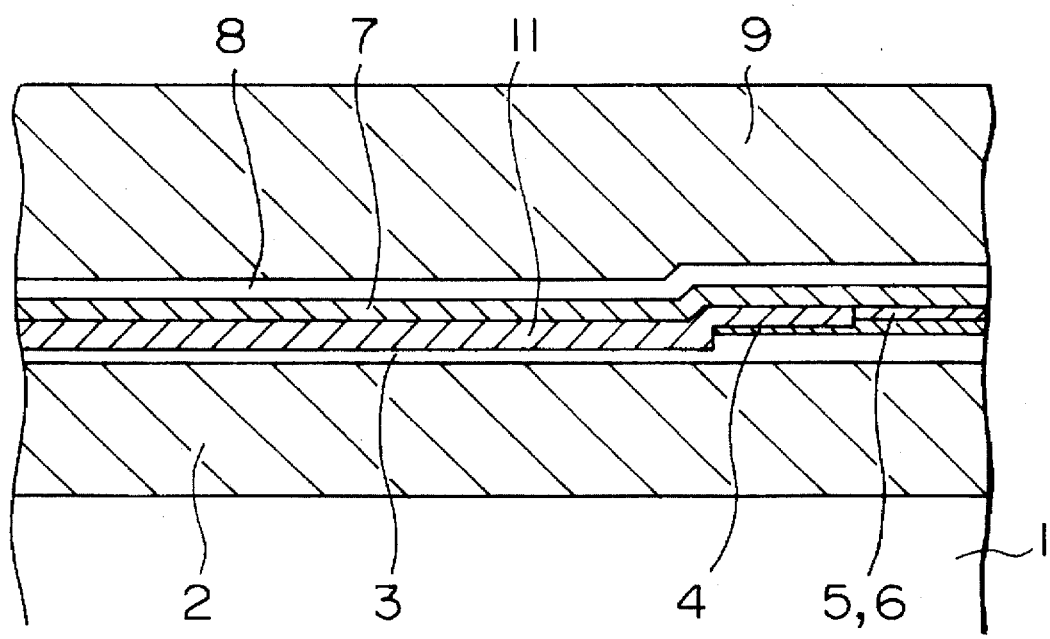
FIG. 11B is a sectional view of the essential parts of a modification of a magnetoresistive thin-film magnetic head according to a fourth embodiment shown in FIG. 11A.

FIG. 11B shows a modification of the embodiment of FIG. 11A. In this modification, the insulating film 11 is formed in such a manner as to cover the overmilled upper surface region of the first insulating film 3 and the overmilled upper surface region of the magnetic domain controlling film 4, so that the insulating film 11 extends to the end of the magnetoresistive element 5.

As a result, this modification has a similar configuration to the embodiment of FIG. 2A. This modification, therefore, is formed by a method similar to the embodiments of FIGS. 2A and 11B and has the same effect as the embodiment of FIG. 2A.

Figure 17A:
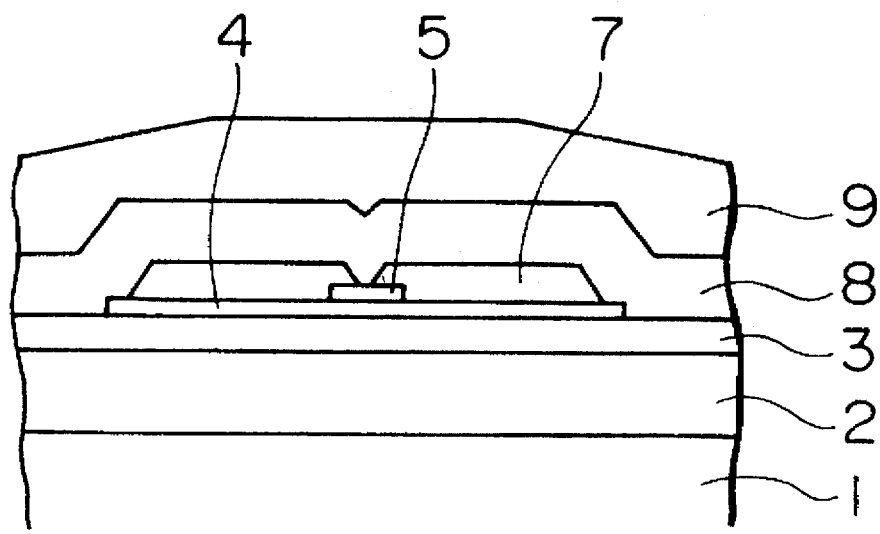
FIGS. 17A to 17B are a sectional view and a plan view respectively showing a configuration of a fifth embodiment of the invention.
Figure 17B:
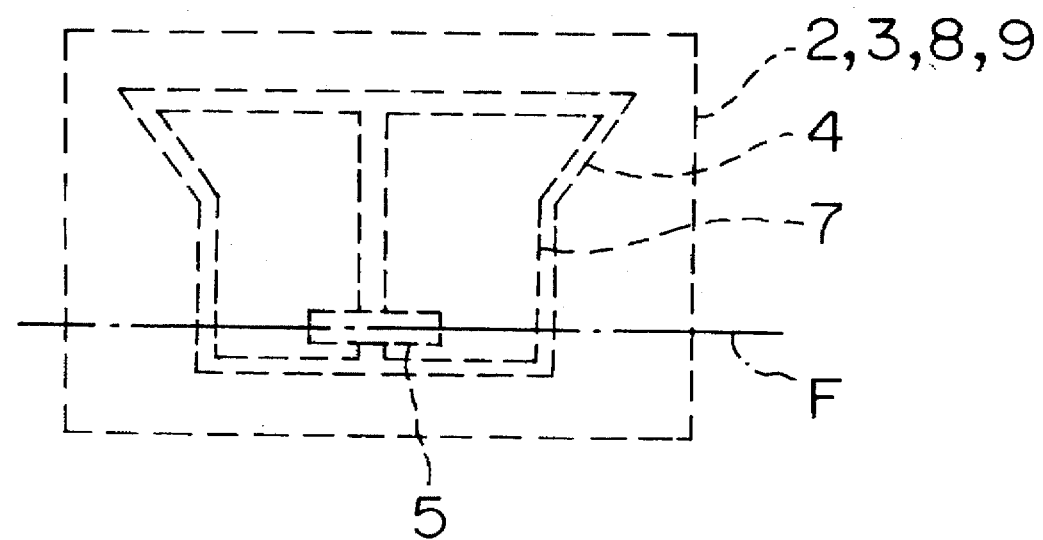

FIGS. 17A, 17B are diagrams for explaining a fifth embodiment of the invention. FIG. 17A shows a sectional view as taken from the floating surface F, and FIG. 17B a plan view. The feature of this fifth embodiment resides in that when an insulating magnetic domain controlling film 4 is patterned on a first insulating film 3, provision is always made to assure that the insulating magnetic domain controlling film 4 lies between the first insulating film 3 and the combination of an electrode film 7 and a magnetoresistive film 5. As a result, the dielectric strength is improved.

Figure 18A:
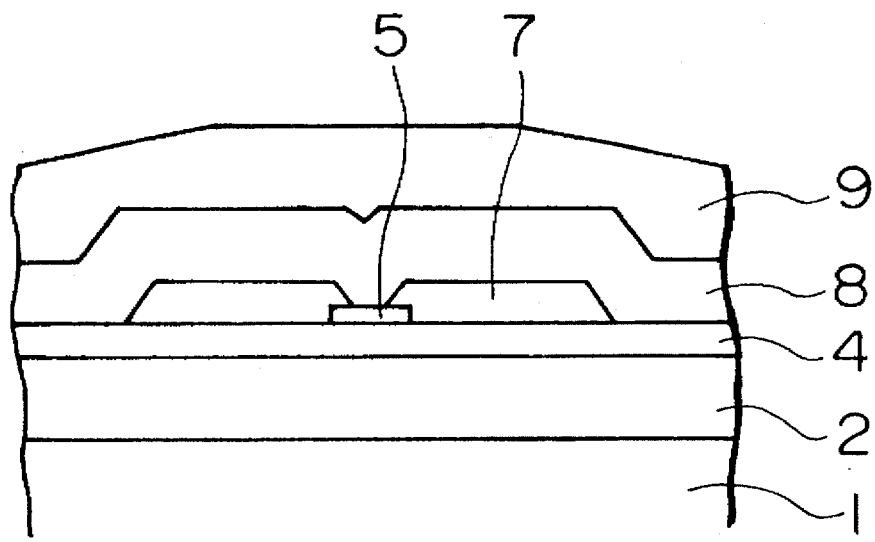
FIGS. 18A to 18B are a sectional view and a plan view respectively showing a configuration of a sixth embodiment of the present invention.
Figure 18B:
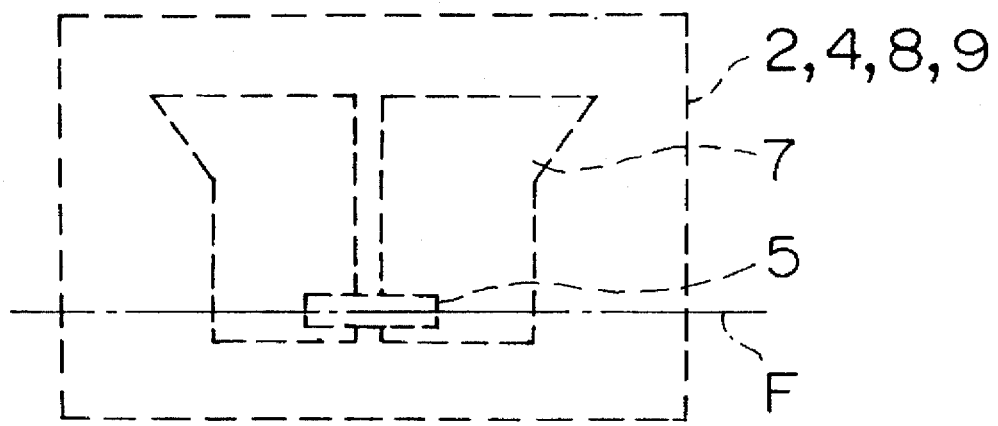

FIGS. 18A, 18B are diagrams for explaining a sixth embodiment of the invention. FIG. 18A is a sectional view as taken from the floating surface F, and FIG. 18B a plan view. According to the sixth embodiment, an insulating magnetic domain controlling film 4 is deposited directly on a lower shield film 2, so that the insulating magnetic domain controlling film 4 also has the function of the first insulating film 3 for an improved dielectric strength.

As described above, according to the fourth to sixth embodiments, a magnetic domain controlling film having the insulating characteristic formed under a magnetoresistive film can secure the dielectric strength. Especially, the electrode film and the first insulating film are prevented from coming into direct contact with each other by securing a large area of the insulating magnetic domain controlling film formed over the lower insulating film on the lower shield film as compared with the magnetoresistive film on the one hand, and by causing an insulating film deposited as a protective insulating film under the electrode to ride over the end of the insulating magnetic domain controlling film on the other hand. As a result, the dielectric strength which is insufficient only with the first insulating film can be secured to a sufficient degree by the dual functions of the protective insulating film and the magnetic domain controlling film.

Further, a magnetoresistive thin-film magnetic head with an improved dielectric strength is provided by a configuration in which an insulating magnetic domain controlling film always lies between an electrode film and a magnetoresistive film on one side and a first insulating film on the other side.

Furthermore, a magnetoresistive thin-film magnetic head with an improved dielectric strength is provided by a configuration in which an insulating magnetic domain controlling film having the function of a first insulating film is directly deposited over a lower shield film.

As described above, there is provided a magnetoresistive thin-film magnetic head that is superior in dielectric strength (between the magnetoresistive film and the electrode film on one side and the upper and lower shield films on the other side). Consequently, a magnetoresistive thin-film magnetic head is provided in which the gap can be narrowed to meet the high-density recording characteristic. At the same time, the detection signal output is increased with an improved head life.

Further, according to the first embodiment and the fourth to sixth embodiments, the insulating film 11 is formed in such a fashion as to ride over the overmilled upper surface region of the noise-suppression film (magnetic domain controlling film) 4. At the time of patterning the noise-suppression film (magnetic domain controlling film) 4 and the insulating film 11, therefore, there is no chance of a gap being created between the end of the insulating film 11 and the opposed end of the noise-suppression film (magnetic domain controlling film) 4, thereby obviating the above-mentioned problem. In other words, the problem can be avoided that the dielectric strength between the electrode 7 and the lower shield film 2 is deteriorated at the gap portion and a leakage current flows from the electrode to the lower shield film 2 with the result that noise is generated in the sense current for reading the signal of the magnetoresistive thin-film magnetic head, or the current flowing in the magnetoresistive element 5 is reduced leading to an insufficient head output.

In each of the above-mentioned embodiments, an insulating film 11 is formed in order to prevent the dielectric breakdown due to a reduced dielectric strength between the electrode (electrode film) 7 and the lower shield film 2. The combined thickness of the lower gap film (lower insulating film) 3 and the insulating film 11 in a region other than the track portion (the gap region between the opposed electrodes and designated by T in FIG. 2A, for example) may be equal to or smaller than the thickness of the track portion as long as the dielectric breakdown can be prevented. The combined thickness of the insulating film 11 and the lower gap film (lower insulating film) 3 in a region other than the track portion, of course, can be larger than the track portion.

In the case where the electrode 7 has an edge portion in each of the aforementioned embodiments, the dielectric strength between the upper shield film 9 and the edge portion of the electrode may be deteriorated. Also, in the case where an edge portion of the lower shield film 2 is present under the electrode 7, the dielectric strength between the edge portion of the lower shield film 2 and the electrode may be deteriorated. In view of this, further embodiments (the seventh to ninth embodiments) will be explained below, in which the insulating layer 3 is multilayered in order to increase the thickness of the insulating film (the first insulating film or the lower gap film) 3 covering at least a part of the edge portion of the lower shield film 2, and/or the insulating film 8 is multilayered in order to increase the thickness of the insulating film (the second insulating film or the upper gap film) 8 covering at least a part of the edge portion of the electrode (electrode film) 7. Specifically, an insulating film 11 is formed further on the insulating film (the first insulating film or the lower gap film) 3 covering at least a part of the edge portion of the lower shield film 2, and an insulating film 113 is further formed on the insulating film (the second insulating film or the upper gap film) 8 covering at least a part of the edge portion of the electrode (electrode film) 7.

According to the seventh to ninth embodiments described below, the lower shield film 2, the lower insulating film (the lower gap film, the first insulating film) 3, the magnetic domain controlling film (the noise suppression film) 4, the biasing film 6, the upper insulating film (the upper gap film, the second insulating film) 8, the upper shield film 9, and the insulating film (the protective insulating film) 11 are referred to as the lower magnetic shield layer 2, the insulating layer 3, the magnetic domain controlling biasing film 4, the soft adjacent layer 6, the insulating layer 8, the upper magnetic field layer 9 and the insulating layer 11, respectively.

The seventh to ninth embodiments described below, like the second and third embodiments shown in FIGS. 5 and 8, are configured in such a manner that the magnetic domain controlling biasing film 4 and the electrode 7 are formed on the two sides of the magnetoresistive element 5 to control the magnetic domain of the magnetoresistive element 5 from the two sides thereof. In the seventh to ninth embodiments, however, the configuration is not confined to the one described above, but a configuration in which the magnetoresistive element 5 is laid over the magnetic domain controlling biasing film 4 is also applicable as in the first embodiment described above.

As a result, according to the seventh to ninth embodiments, like the second to third embodiments, the insulating film 11 is formed on the overmilled upper surface region of the insulating film (the first insulating film or the lower gap film) 3.

A magnetoresistive thin-film magnetic head according to the seventh to ninth embodiments will be explained below with reference to the accompanying drawings.

Explanation will be made about a magnetoresistive magnetic head according to the seventh embodiment in which the insulating film between the upper magnetic shield layer and the electrode and the insulating layer between the lower magnetic shield layer and the electrode are multilayered except for the magnetic field sensing portion.

Figure 19:
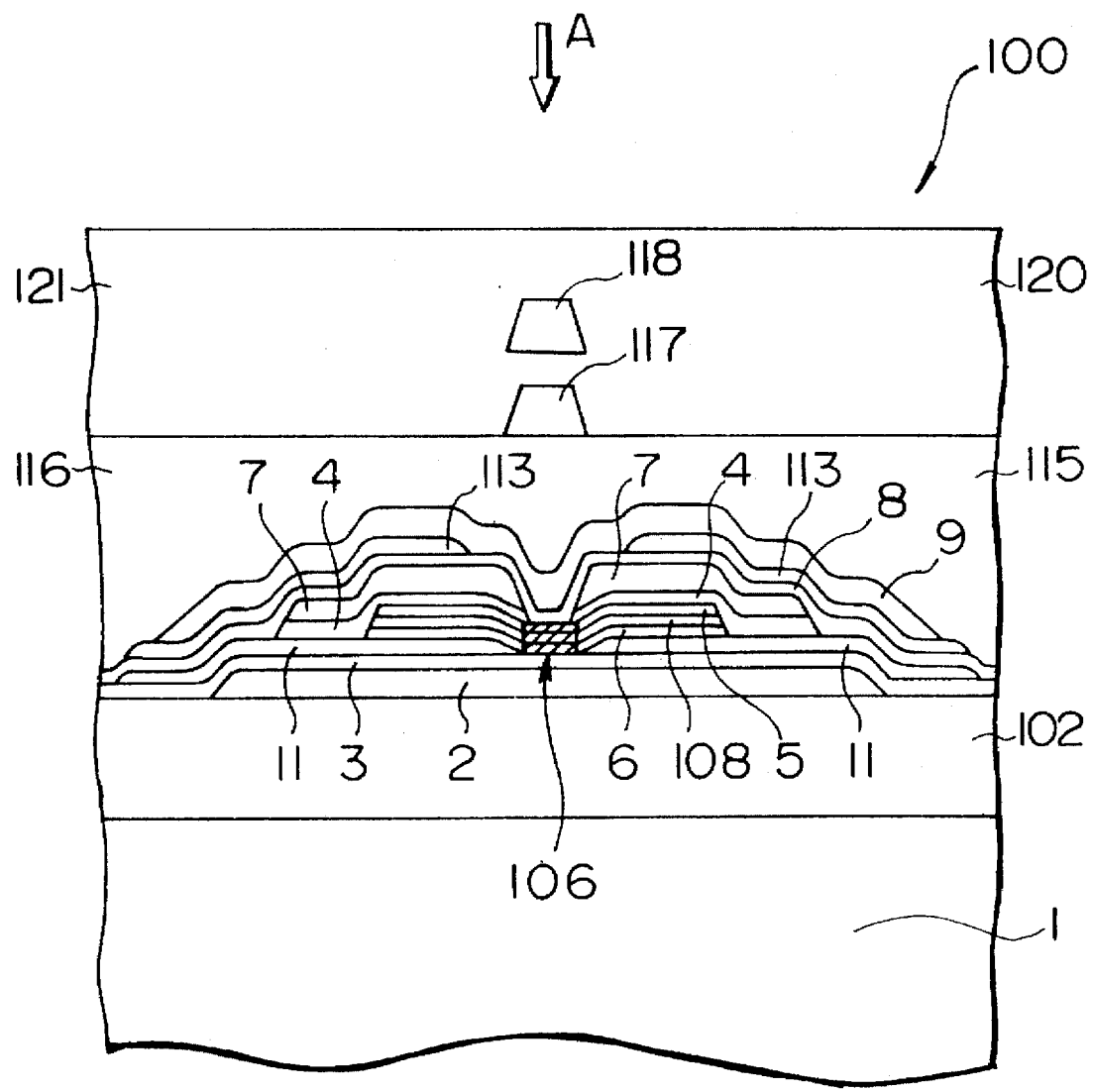
FIG. 19 is a sectional view of the essential parts of a magnetoresistive thin-film magnetic head according to a seventh embodiment of the invention.
Figure 20:
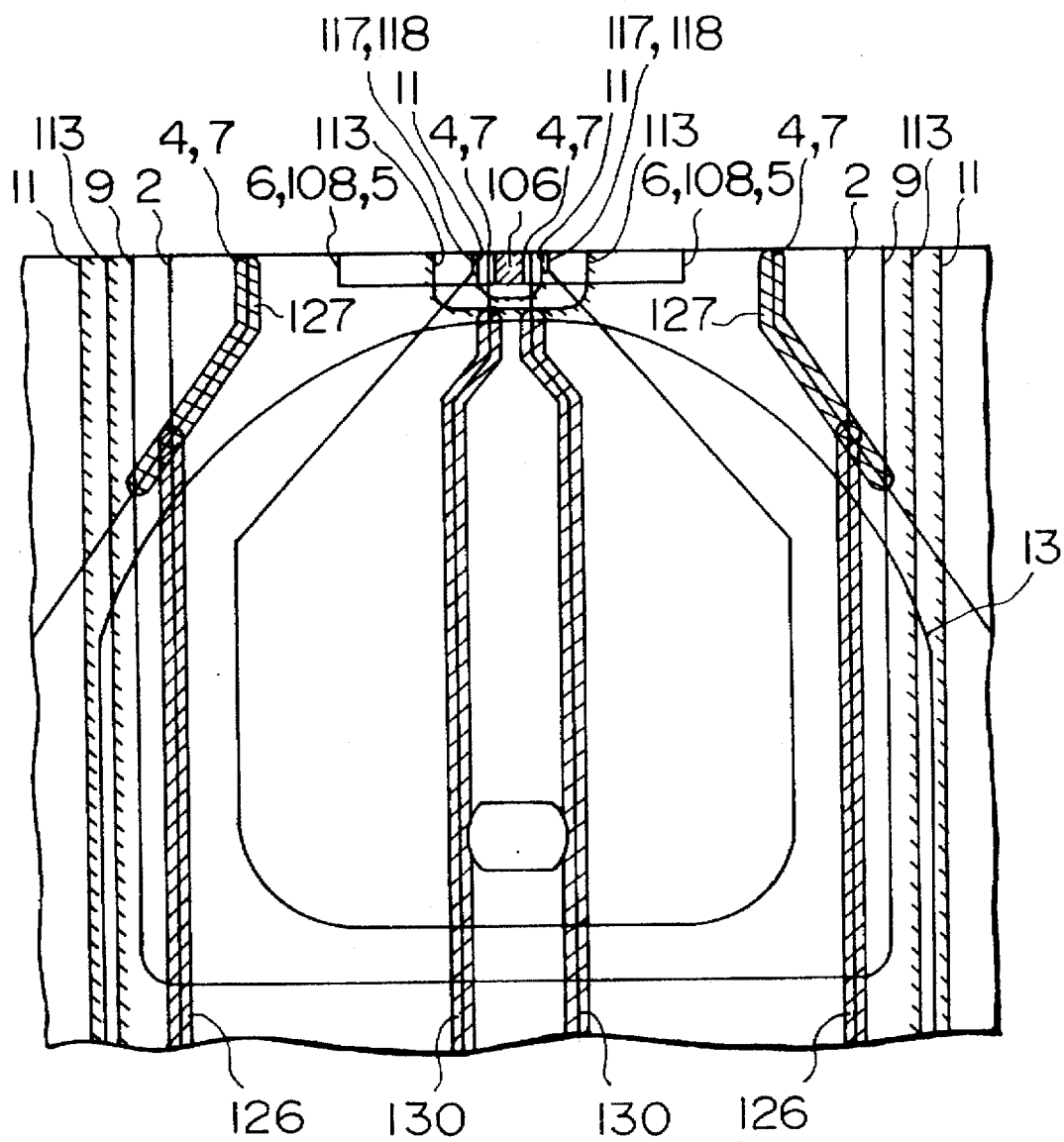
FIG. 20 is a sectional view of each layer of the magnetoresistive thin-film magnetic head of FIG. 19 as taken from the direction of arrow A in FIG. 19.
Figure 25:
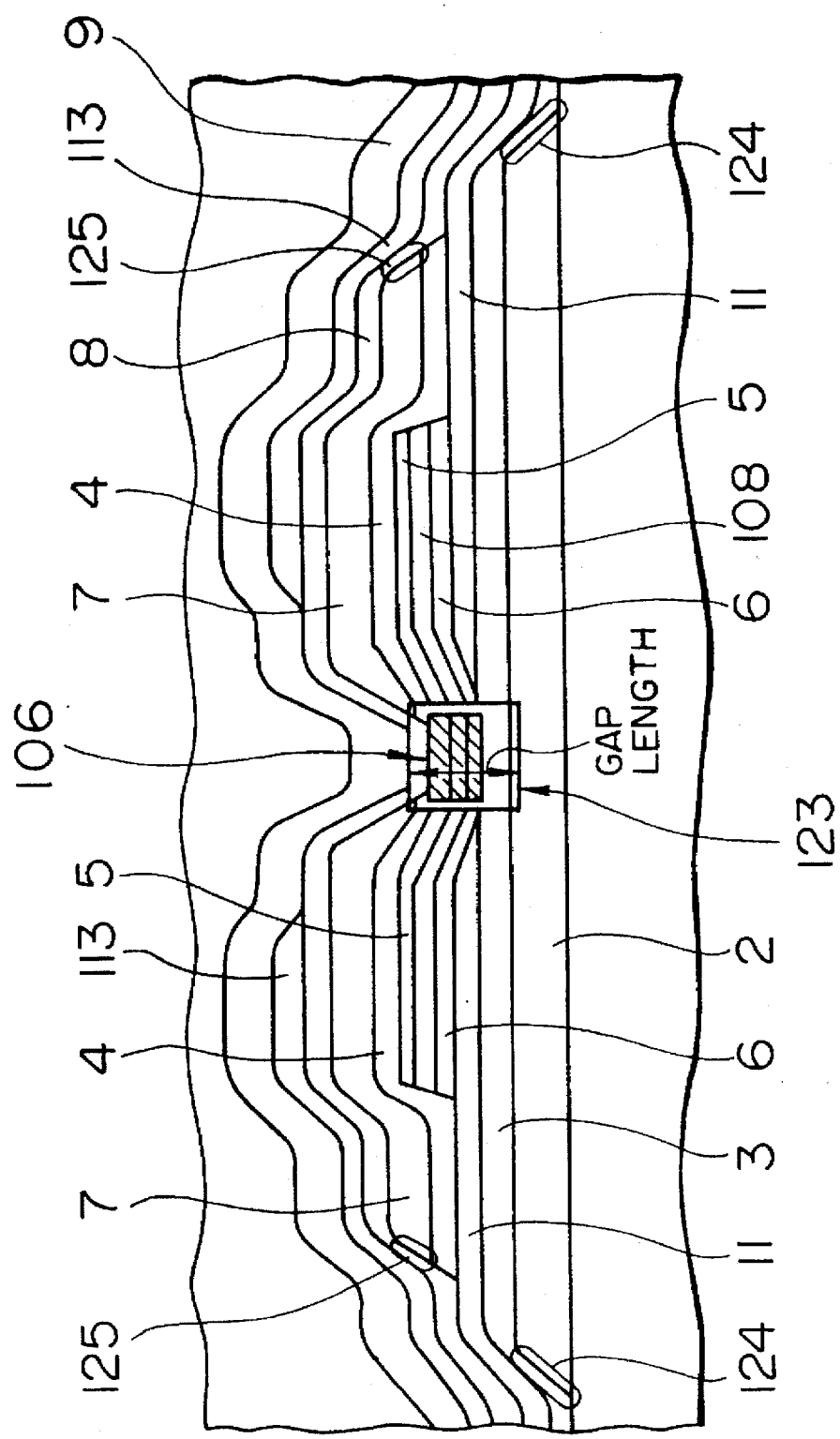
FIG. 25 is an enlarged sectional view of the magnetic field sensing portion of the magnetoresistive thin-film magnetic head shown in FIG. 19.

In FIGS. 19, 20 and 25, the magnetoresistive thin-film magnetic head 100 includes a substrate 1, a recording head 121 for writing a signal into a magnetic recording medium (not shown), and a reproducing (read) head 116 for reading a signal from the magnetic recording medium.

The reproducing head 116 includes an upper magnetic shield layer 9, a lower magnetic shield layer 2, a magnetoresistive film 5 for reading a signal magnetic field from the magnetic recording medium, a soft adjacent layer 6 for applying a lateral bias magnetic field to the magnetoreistive film 5, a magnetic domain controlling biasing film 4 for controlling the magnetic domain structure in the magnetoresistive film, a high-resistance conductive film 108, an electrode 7 for supplying a sense current to the magnetoresistive film 5, and insulating layers 3 and 8 for insulating the electrode 7. The reproducing head 116 further includes insulating layers 11, 113 with the insulating layers 3, 8 multilayered. The lower magnetic shield layer 2 is formed with the edge 124 thereof in steps (FIG. 25). Also, an external edge 125 of the electrode 7 is also formed with steps.

A magnetic field sensing portion 106 is formed of a soft adjacent layer 6, a high-resistance conductive film 108 and a magnetoresistive film 5 on the lower surface region between the opposed electrode portions 7. Also, the magnetic field sensing portion 106, the insulating layer 3 under the magnetic field sensing portion 106, and the insulating layer 8 over the magnetic field sensing portion 106 constitute a gap 123 (FIG. 25). The thickness of the gap 123 provides the length thereof.

The recording head 121 includes an upper magnetic pole 118, a lower magnetic pole 117, and a coil 13 inserted between the upper magnetic pole 118 and the lower magnetic pole 117 (FIG. 20).

Next, an example method of fabricating the magnetoresistive magnetic head described above will be explained below.

The magnetoresistive magnetic head 100 is formed of a base insulating layer 102 (such as an insulating layer of alumina) laid for the purpose of flattening as a thick layer on the substrate 1 made of an insulating material like alumina TiC. As the next step, a lower magnetic shield layer 2 is laid to the thickness of 1 to 4 µm and processed to a predetermined shape. This process is performed by photolithography and dry etching. An insulating layer (such as of alumina) 3 is deposited to the thickness of 0.05 to 0.2 µm thereby to form a part of the gap 123. The lower magnetic shield layer 2 and the insulating layer 3 are deposited, for example, by sputtering.

According to the embodiment under consideration, the insulating layer 3 and other insulating layers are formed of alumina. Nevertheless, such insulating layers may alternatively be made of an insulating material other than alumina such as silica or titania.

After the insulating layer 3 is deposited as described above, an insulating layer 11 is deposited. The insulating layer 11 is deposited in such a manner as to cover the entire surface of the lower magnetic shield layer 2 through the insulating layer 3 except for the magnetic field sensing portion 106 of the magnetoresistive head 100 and the vicinity thereof. Also, the insulating layer 11 is deposited to the thickness of at least 0.1 µm using the lift-off method, for example.

As a result, as shown in FIGS. 20 and 25, the insulating portion 126 between the electrode 7 and the edge 124 of the lower magnetic shield layer 2 is multilayered for an increased thickness of the particular portion.

After that, the soft adjacent layer 6, the high-resistance conductive film 108 and the magnetoresistive film 5 are deposited and processed to a predetermined shape. These portions including the soft adjacent layer 6, the high-resistance conductive film 108 and the magnetoresistive film 5 are deposited by sputtering, for example. These portions may alternatively be formed by vapor deposition. As another alternative, these portions can be processed to a predetermined shape by photolithography and dry etching.

In the next step, the magnetic domain controlling biasing film 4 for controlling the magnetic domain structure in the magnetoresistive film 5 and a conductive layer forming the electrode 7 such as a conductive layer made of Nb/Au/Nb are deposited by sputtering, for example. The same magnetic domain controlling biasing film 4 and the conductive layer may alternatively be formed by vapor deposition. The electrode 7 is formed to a predetermined shape using, for example, the lift-off method. In forming the electrode 7, however, the magnetic domain controlling biasing film 4 is required to grow epitaxially on the magnetoresistive film 5. The surface of the magnetoresistive film 5, therefore, must be slightly cleaned in advance without damaging the same. The ion cleaning method may be used for this purpose.

The present embodiments uses an NiFe film as the magnetoresistive film 5, an FeMnNi film as the magnetic domain controlling biasing film 4, and an NiFeCoNb film as the soft adjacent layer 6. In place of these materials, the magnetoresistive film 5 may be made of an NiCo film or an NiFeCo film, the magnetic domain controlling biasing film 4 of a permanent magnet film such as an antiferromagnetic film or a CoPt film, and the soft adjacent layer 6 of a soft magnetic film such as an NiFeRh film.

After the electrode 7 is formed in the above-mentioned manner, an insulating layer 8 forming a part of the gap 123 is deposited to the thickness of 0.05 to 0.2 μm. Following this step, as shown in FIGS. 20 and 25, an insulating layer 113 is deposited in such a fashion as to cover a part of the outer edges 125 of the electrode 7 except for the magnetic field sensing portion 106 and the vicinity thereof. The insulating layer 113 is deposited to the thickness of at least 0.1 μm by the lift-off method. An insulating portion 127 between the outer edge 125 of the electrode 7 and the upper magnetic shield layer 9 is multilayered for an increased thickness of the particular portion. In the process, the outer edge 125 of the electrode 7 located in such a position as not to be covered by the upper magnetic shield layer 9 need not be multilayered. The reason is that the portion not covered by the upper magnetic shield layer 9 does not substantially develop leakage of the sense current from the electrode 7. An insulating portion 130 between the upper magnetic shield layer 9 and the edge portion internal to the electrode 7 except for the vicinity of the magnetic field sensing portion 106 is also deposited in multiple layers.

As the next step, the upper magnetic shield layer 9 is deposited to the thickness of 1 to 4 μm by sputtering and is processed to a predetermined shape. Finally, an insulating film 115 is deposited to the thickness of at least several μm for the purpose of protection and flattening. The etch-back method, for example, is used for the process thereby to terminate the fabrication process of the reproducing head 116.

The insulating film 115 thus flattened has formed thereon a lower magnetic pole 117, an upper magnetic pole 118, a coil 13 and an insulating layer 120 in that order. A recording head 121 is thus fabricated, while terminating the fabrication of a magnetoresistive magnetic head 100 of dual-head type.

The lower magnetic pole 117 may be omitted, and may be replaced by the upper magnetic shield layer 9 doubling as a lower magnetic pole.

The operating principle of the magnetoresistive magnetic head 100 according to this embodiment will be explained below.

The magnetic head 100 operates to write signals into a magnetic recording medium (not shown) using electromagnetic induction by means of the recording head 121. In reproducing this signal, the reproducing (read) head 116 reads out the signal. The first step for reading a signal is supplying a sense current to the magnetoresistive film 5, the conductive film 108 and the soft adjacent layer 6 through the electrode 7. Upon application of a sense current, the magnetic field produced mainly by the soft adjacent film 6 causes the direction of magnetization in the magnetoresistive film 5 to form a certain angle to the direction of the sensor current. This angle is adjusted to about 45 degrees into an optimal biased state by appropriately regulating the sense current.

Under this condition, assume that a signal magnetic field of a different polarity written in the magnetic recording medium enters the magnetoresistive film 5. In accordance with the strength of the signal magnetic field thus entered, the magnetization in the magnetoresistive film 5 rotates with the above-mentioned angle increasing or decreasing from 45 degrees. Correspondingly to this angular change, the electrical resistance of the magnetoresistive film 5 decreases or increases, as the case may be. The reading of the signal becomes possible by detecting the resistance change of this magnetoresistive film 5 as a voltage change. This voltage change, i.e., the output, increases in proportion to the current flowing in the magnetoresistive film 5.

During this reproducing operation, the temperature of the magnetoresistive film 5 and the soft adjacent film 6 rises due to Joule heating. This temperature is settled at a predetermined value as a balance attained between the amount of Joule heat and the amount of heat released through the electrode 7 and the upper and lower insulating layers 3, 8. When the temperature is excessively high, the output decreases since the resistance change rate of the magnetoresistive film 5 decreases. Also, the electro-migration is accelerated, resulting in a reduced life of the magnetic head. This temperature, therefore, is preferably maintained as low as possible.

An appropriate biasing magnetic field is exerted on the magnetoresistive film 5 in the easy direction of magnetization by exchange coupling between the magnetoresistive film 5 and the magnetic domain controlling biasing film 4 deposited on the magnetoresistive film 5. This effect maintains a substantially simple magnetic domain state in the magnetoresistive film 5. Under this condition, any attempt of a signal write or read operation generates no Barkhausen noise. When the biasing magnetic field is weak, however, the single magnetic domain state in the magnetoresistive film 5 is corrupted, causing Barkhause noise due to generation of a magnetic domain. The strength of the biasing magnetic field due to the exchange coupling, therefore, is required to be higher than a certain level.

The operating principle of a magnetoresistive magnetic head 100 according to this embodiment is described above. A magnetoresistive magnetic head according to the embodiment, as described above, includes a thick insulating layer between the edge 124 of the lower magnetic shield layer 2 and the electrode 7, between the outer edge 125 of the electrode 7 and the upper magnetic shield layer 9 and between the upper magnetic shield layer 9 and the inner edge portion of the electrode 7 except for the vicinity of the magnetic field sensing portion 106. As a result, the leakage of the sense current or the dielectric breakdown of the insulating layer can be reduced in this region.

The above-mentioned embodiment utilizes the soft adjacent layer biasing method for application of a biasing magnetic field. The embodiment, however, is not specifically limited to the soft adjacent biasing method. Instead, the shunt biasing scheme, the permanent magnet biasing scheme or the like biasing method may be used with equal effect according to the invention.

Figure 21:
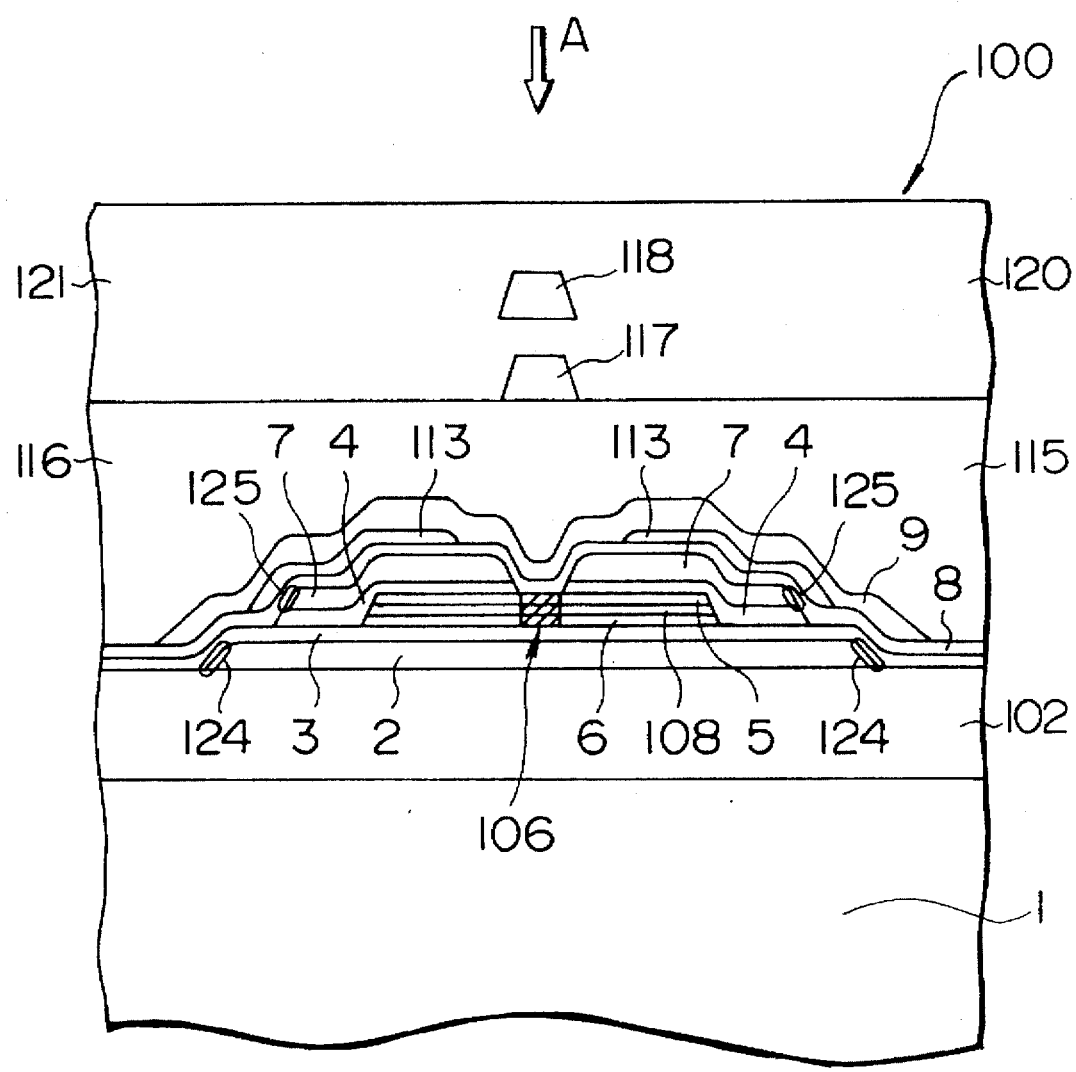
FIG. 21 is a sectional view of the essential parts of a magnetoresistive thin-film magnetic head according to an eighth embodiment of the invention.
Figure 22:
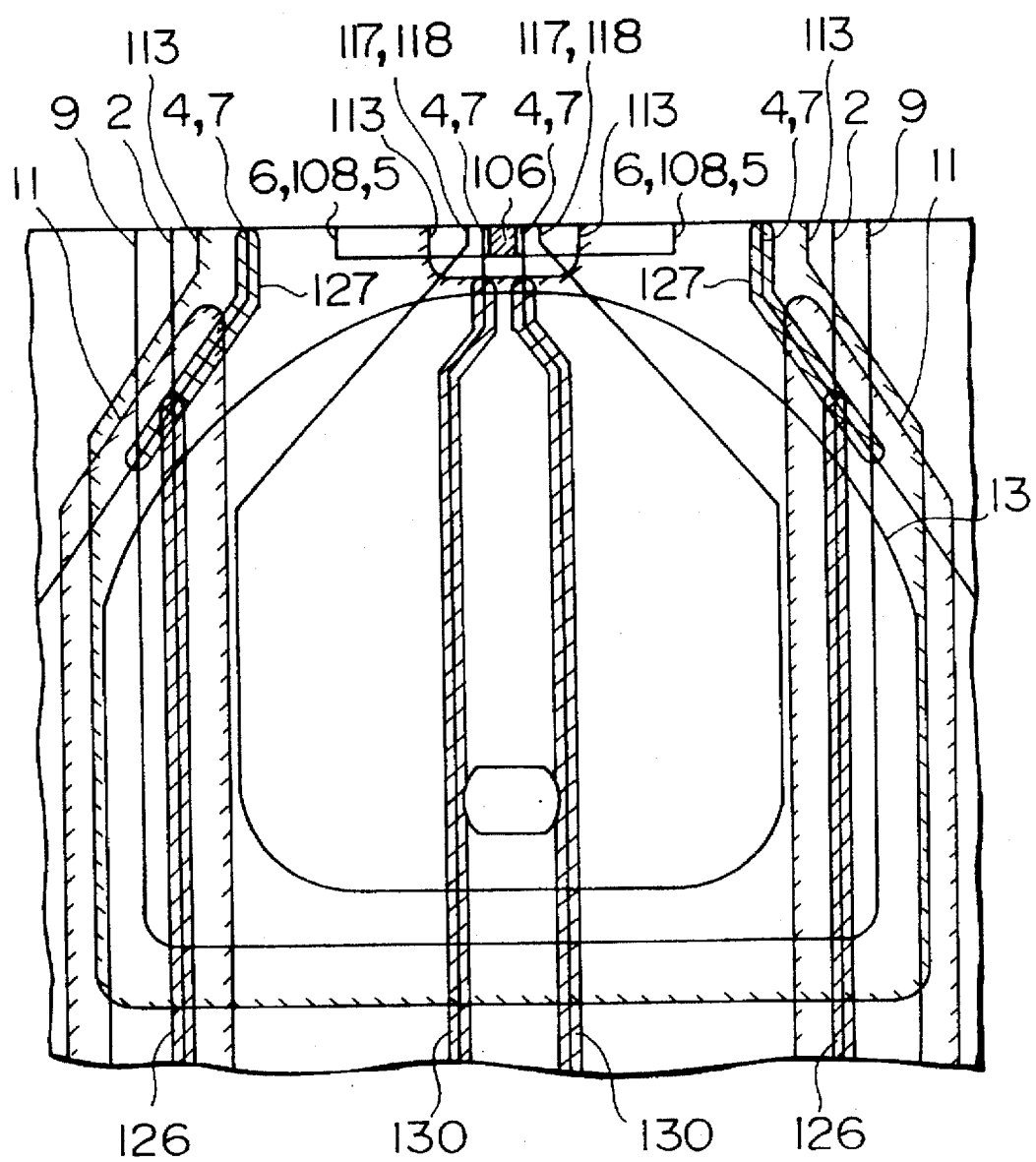
FIG. 22 is a sectional view of each layer of the magnetoresistive thin-film magnetic head of FIG. 21 as taken from the direction of arrow A in FIG. 21.

Explanation will now be made about a magnetoresistive magnetic head according to an eighth embodiment comprising an insulating layer having a different shape from the insulating layer 11 and the insulating layer 113 in the first embodiment. In FIGS. 21 and 22, the magnetoresistive magnetic head according to this embodiment has the same component elements as those of the embodiment shown in FIG. 7.

An example method of fabricating a magnetoresistive magnetic head according to this embodiment will be explained.

In FIGS. 21 and 22, a magnetoresistive magnetic head 100 has a base insulating layer 102 (made of alumina, for example) deposited as a thick layer on a substrate 1 of an insulating material such as alumina TiC. As the next step, a lower magnetic shield layer 2 is deposited to the thickness of 1 to 4 μm and processed to a predetermined shape. This processing is performed by photolithography and dry etching, for example. An insulating layer 3 (of alumina, for example) is deposited to the thickness of 0.05 to 0.2 μm thereby to form a part of the gap 123. The lower magnetic shield layer 2 and the insulating layer 3 are deposited by sputtering, for example.

According to the present embodiment, alumina is also used as a material of an insulating layer. An insulating material other than alumina such as silica or titania, however, may alternatively be used.

After the insulating layer 3 is deposited in this manner, a soft adjacent layer 6, a high-resistance conductive film 108 and a magnetoresistive film 5 are deposited and processed to a predetermined shape. These films including the soft adjacent layer 6, the high-resistance conductive film 108 and the magnetoresistive film 5 are deposited by sputtering, for example. These films may alternatively be formed by vapor deposition. Also, these films may be processed to a predetermined shape by, for example, photolithography and dry etching. As the next step, an insulating layer 11 is deposited to the thickness of at least 0.1 μm using the lift-off method, for example. The insulating layer 11 is deposited in such a manner as to cover a part of the edge portion 124 of the lower magnetic shield layer 2 through the insulating layer 3. As shown in FIGS. 21 and 22, therefore, the insulating portion 126 between the electrode 7 and the edge portion 124 of the lower magnetic shield layer 2 is multilayered for an increased thickness of the particular portion. In the process, the edge portion 124 of the lower magnetic shield layer 2 located in such a position as not to be covered by the electrode 7 is not required to be multilayered. This is by reason of the fact that substantially no leakage occurs of the sense current from the electrode 7 at the portion not covered by the electrode 7.

After this process, a magnetic domain controlling biasing film 4 for controlling the magnetic domain structure in the magnetoresistive film 5 and a conductive layer forming the electrode 7 such as a conductive layer composed of Nb/Au/Nb, for example, are deposited by sputtering. These films may alternatively be formed by vapor deposition. The electrode 7 is formed to a predetermined shape using, for example, the lift-off method. In forming the electrode 7, the magnetic domain controlling biasing film 4 is required to grow epitaxially over the magnetoresistive film 5. The surface of the magnetoresistive film 5, therefore, is required to be cleaned slightly in advance and free of damage. This cleaning may be performed using the ion-cleaning process.

According to the embodiment under consideration, an NiPe film is used for the magnetoresistive film 5, an PeMnNi film for the magnetic domain controlling biasing film 4, and an NiFeCoNb film for the soft adjacent layer 6. In place of these materials, an NiCo film or an NiFeCo film may be used for the magnetoresistive film 5, an antiferrormagnetic film or a permanent magnet film such as CoPt for the magnetic domain controlling biasing film 5, and a soft magnetic film such as an NiFeRh film for the soft adjacent layer 7.

After forming up to the electrode 7 in the above-mentioned manner, an insulating layer 8 providing a part of the gap 123 is deposited to the thickness of 0.05 to 0.2 μm. After that, as shown in FIGS. 21 and 22, an insulating layer 113 is deposited in such a manner as to cover a part of an outer edge portion 125 of the electrode 7. The insulating layer 113 is deposited, for example, to the thickness of at least 0.1 μm by the lift-off method.

The insulating layer 127 between the outer edge portion 125 of the electrode 7 and the upper magnetic shield layer 9 is thus multilayered for an increased thickness of the particular portion. In the process, the outer edge portion 125 of the electrode 7 located in such a position as not to be covered by the upper magnetic shield layer 9 is not required to be multilayered. This is by reason of the fact that there occurs substantially no leakage of sense current from the electrode 7 at the portion not covered by the upper magnetic shield layer 9. The insulating portion 130 between the upper magnetic shield layer 9 and the inner edge portion of the electrode 8 except for the vicinity of the magnetic field sensing portion 106 is also multilayered.

The upper magnetic shield layer 9 is then deposited to the thickness of 1 to 4 μm by sputtering or the like and is processed to a predetermined shape. Lastly, an insulating layer 115 is deposited as a thick layer of several μm for the purpose of protection and flattening. The flattening process is performed by etch-back, for example, thus completing the fabrication of the reproducing head 116.

Further, the flattened insulating film 115 has formed thereon a lower magnetic pole 117, an upper magnetic pole 118, a coil 13 and an insulating layer 120 in that order, thereby to fabricate a recording head 121. Fabrication of the magnetoresistive magnetic head 100 of dual-head type is thus finished.

The lower magnetic pole 117 may be omitted, and instead the upper magnetic shield layer 9 may double as a lower magnetic pole.

The operating principle of the magnetoresistive magnetic head 100 according to this embodiment is similar to that of the magnetoresistive magnetic head according to the seventh embodiment.

The effect of the magnetoresistive magnetic head 100 according to the present embodiment is substantially similar to that of the magnetoresistive magnetic head 100 of the seventh embodiment. In the magnetoresistive magnetic head according to this embodiment, the insulating layer is thickened between the edge portion 124 of the lower magnetic shield layer 2 and the electrode 7, between the outer edge portion 125 of the electrode 7 and the upper magnetic shield layer 9, and between the upper magnetic shield layer 9 and the inner edge portion of the electrode 7 except for the vicinity of the magnetic field sensing portion 106. As a result, leakage of the sense current or the dielectric breakdown of the insulating layer can be reduced in these regions.

The embodiment under consideration also utilizes the soft adjacent layer biasing technique for applying a biasing magnetic field. The embodiment, however, is not specifically limited to the soft adjacent layer biasing technique, but the shunt biasing scheme, the permanent magnet biasing scheme or other similar biasing techniques can also be applied to the invention with equal effect.

Now, explanation will be made about a magnetoresistive magnetic head 100 with an insulating layer multilayered between the edge portion of a lower magnetic shield layer and an electrode.

Figure 23:
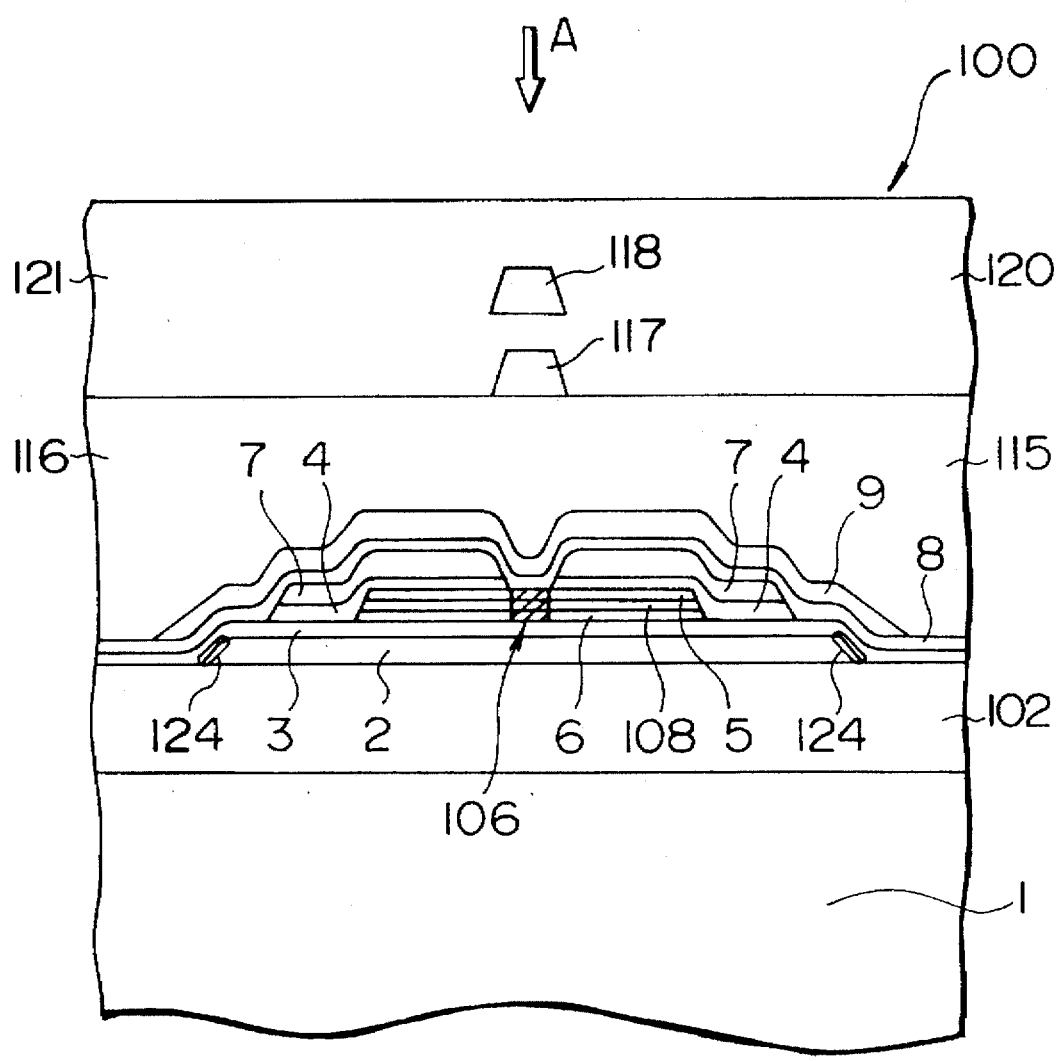
FIG. 23 is a sectional view of the essential parts of a magnetoresistive thin-film magnetic head according to a ninth embodiment of the invention.
Figure 24:
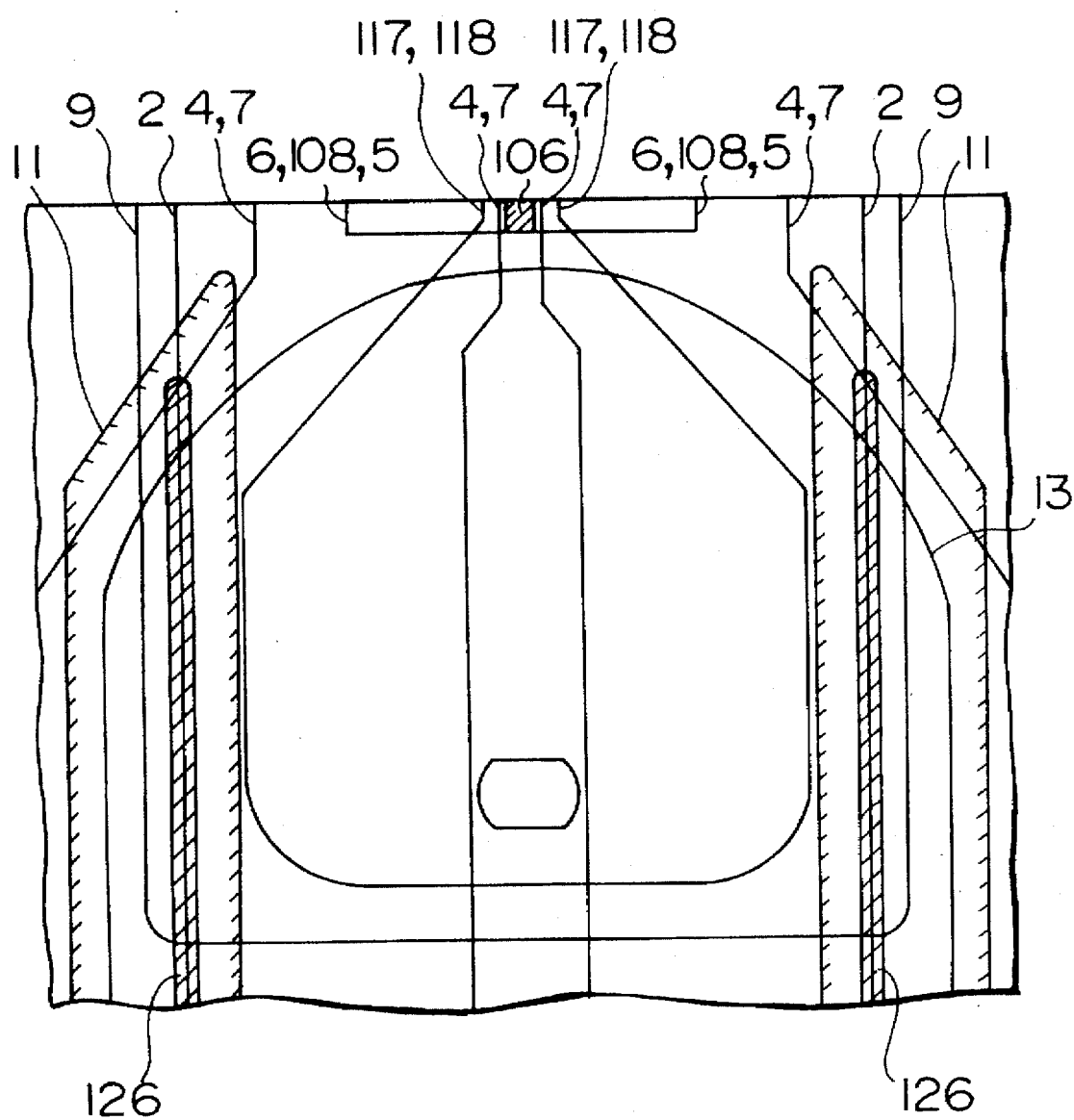
FIG. 24 is a sectional view of each layer of the magnetoresistive thin-film magnetic head of FIG. 23 as taken from the direction of arrow A in FIG. 22.

In FIGS. 23 and 24, the magnetoresistive magnetic head 100 is such that the insulating layer 113 of the eighth embodiment is not produced. The remaining configuration and the fabrication processes, however, are similar to those for the magnetoresistive magnetic head 100 according to the eighth embodiment.

Also, the magnetoresistive magnetic head 100 according to this embodiment, which has a thick insulating layer between the edge portion 124 of the lower magnetic shield layer 2 and the electrode 7, can prevent leakage of the sense current or dielectric breakdown of the insulating layer in the particular region.

The present embodiment also utilizes the soft adjacent layer biasing technique for applying a biasing magnetic field. In spite of this, other biasing methods such as the shunt biasing or the permanent magnet biasing technique can be applied to the present invention with equal effect.

According to the magnetoresistive magnetic head of the seventh to ninth embodiments described above, the insulating layer covering the surface of the lower magnetic shield layer has at least a part of the side of the edge portion of the lower magnetic shield layer thicker than that of the gap. Consequently, the insulating resistance and the dielectric strength of the insulating layer on the side of the edge portion of the lower magnetic shield layer are improved. In other words, leakage of the sense current between the lower magnetic shield layer and the electrode and the dielectric breakdown of the insulating layer on the side of the edge portion of the lower magnetic shield layer can be reduced.

Further, the insulating layer between the electrode and the upper magnetic shield layer covers the surface of the electrode, and a part of the side of the edge portion of the electrode has a greater thickness than the gap. Thus the insulating resistance and the dielectric strength on the side of the edge portion of the electrode are improved.

We claim:

1. A magnetoresistive thin-film magnetic head comprising:

a lower shield film provided on a substrate;

a magnetoresistive film for converting a magnetic signal from a recording medium into an electrical signal using the magnetoresistive effect;

a magnetic-domain-controlling noise-suppression film provided under said magnetoresistive film for controlling the magnetic domain of the magnetoresistive film;

an electrode film covering the upper peripheral portion of the magnetoresistive film and supplying a signal detection current to the magnetoresistive film for detecting the converted electrical signal;

an upper shield film provided above the electrode film and the magnetoresistive film;

an upper insulating film inserted between the upper shield film and the combination of the magnetoresistive film and the electrode film for insulating the magnetoresistive film and the electrode film from the upper shield film;

a lower insulating film inserted between the lower shield film and the combination of the magnetoresistive film, the electrode film and the magnetic-domain-controlling noise-suppression film for insulating the magnetoresistive film, the electrode film and the magnetic-domain-controlling noise-suppression film from the lower shield film; and an insulating film inserted between the electrode film and the lower insulating film;

wherein a first portion of the lower insulating film that is not right under the magnetic-domain-controlling noise-suppression film has a thickness that is less than that of a second portion of the lower insulating film that is right under the magnetic-domain-controlling noise-suppression film, wherein a first portion of the magnetic-domain-controlling noise-suppression film that is not right under the magnetoresistive film has a thickness that is less than that of a second portion of the magnetic-domain-controlling noise-suppression film that is right under the magnetoresistive film, and wherein said insulating film extends contiguously over the first portion of said lower insulating film and over a part of the first portion of said magnetic-domain-controlling noise-suppression film.

2. A magnetoresistive thin-film magnetic head according to claim 1:

wherein said insulating film extends to the ends of the magnetoresistive film on the first portion of said magnetic-domain-controlling noise-suppression film.

3. A magnetoresistive thin-film magnetic head according to claim 1:

wherein said magnetic-domain-controlling noise-suppression film is formed of an insulating material.

4. A magnetoresistive thin-film magnetic head according to claim 1:

wherein said electrode film is in contact with the magnetoresistive film, the insulating film, and the upper insulating film, but not in contact with the lower insulating film.

5. A magnetoresistive thin-film magnetic head according to claim 1:

wherein the area of said magnetic-domain-controlling noise-suppression film is larger than that of said magnetoresistive film.

6. A magnetoresistive thin-film magnetic head according to claim 1, wherein the magnetic-domain-controlling noise-suppression film is in contact with the magnetoresistive film.

* * * * *